US012627750B2

(12) United States Patent
Dolby et al.

(10) Patent No.: US 12,627,750 B2
(45) Date of Patent: May 12, 2026

(54) AUTOMATIC OPTIMIZATION OF REMOTE SERVICE REQUEST

(71) Applicant: INTERNATIONAL BUSINESS MACHINES CORPORATION, Armonk, NY (US)

(72) Inventors: Trevor Clifford Dolby, Edina, MN (US); John Anthony Reeve, Winchester (GB); Andrew John Coleman, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 18/922,902

(22) Filed: Oct. 22, 2024

(65) Prior Publication Data

US 2026/0075123 A1 Mar. 12, 2026

(30) Foreign Application Priority Data

Sep. 12, 2024 (GB) ...................................... 2413431

(51) Int. Cl.
| *G06F 15/16* | (2006.01) |
| *H04L 67/02* | (2022.01) |
| *H04L 69/08* | (2022.01) |

(52) U.S. Cl.
CPC .............. *H04L 69/08* (2013.01); *H04L 67/02* (2013.01)

(58) Field of Classification Search
CPC ................................. H04L 67/02; H04L 69/08

(Continued)

(56) References Cited

U.S. PATENT DOCUMENTS

| 6,885,658 B1* | 4/2005 | Ress ....................... H04L 12/66 |
| | | 370/352 |
| 7,162,024 B2* | 1/2007 | Wah ..................... H04Q 3/0025 |
| | | 370/467 |

(Continued)

FOREIGN PATENT DOCUMENTS

| CN | 112003686 A | 11/2020 |
| CN | 115633102 A | 1/2023 |

(Continued)

OTHER PUBLICATIONS

Intellectual Property Office, Patents Act 1977: Search Report under Section 17(5), Jan. 31, 2025, 3 Pages, GB Application No. 2413431. 4.

(Continued)

*Primary Examiner* — Moustafa M Meky
(74) *Attorney, Agent, or Firm* — Edward J. Wixted, III

(57) ABSTRACT

A computer-implemented method, computer system, and computer program product for communication between a sender and a receiver according to a communication protocol, comprising: generating a message for sending to a receiver; translating the message from a sender format used by the sender into a predetermined format dependent on the communication protocol; sending the translated message to the receiver, the translated message comprising a map invitation; causing the receiver to translate the translated message into a receiver format used by the receiver; causing the receiver to exchange a first map indicative of a mapping between a first format and the predetermined format; and sending a subsequent message to the receiver in the first format.

20 Claims, 16 Drawing Sheets

(58) Field of Classification Search
USPC ........................................................ 709/230
See application file for complete search history.

(56)                    References Cited

U.S. PATENT DOCUMENTS

| | | | | |
|---|---|---|---|---|
| 7,209,950 | B2 * | 4/2007 | Bennett ............... | H04W 88/184 |
| | | | | 455/414.4 |
| 7,523,208 | B2 * | 4/2009 | Auerbach .............. | G06Q 30/02 |
| | | | | 709/228 |
| 8,863,150 | B2 * | 10/2014 | Meeker ................... | G06F 9/541 |
| | | | | 719/310 |
| 10,476,755 | B1 | 11/2019 | A et al. | |
| 10,575,250 | B2 | 2/2020 | Malas et al. | |
| 11,388,266 | B2 * | 7/2022 | Seemann ................ | H04L 12/12 |
| 11,442,923 | B1 | 9/2022 | Lingamneni | |
| 11,526,574 | B2 | 12/2022 | Carbou et al. | |
| 11,537,445 | B2 | 12/2022 | Reeve et al. | |
| 11,561,997 | B2 | 1/2023 | Pigeon et al. | |
| 11,562,124 | B2 * | 1/2023 | Gupta ................... | H04L 51/066 |
| 11,714,693 | B2 | 8/2023 | Kennedy, Jr. | |
| 12,411,796 | B2 * | 9/2025 | Li ........................... | H04L 69/18 |
| 2003/0101283 | A1 * | 5/2003 | Lewis ..................... | H04W 4/12 |
| | | | | 709/246 |
| 2003/0115336 | A1 * | 6/2003 | Auerbach .............. | G06Q 30/02 |
| | | | | 709/228 |
| 2013/0219411 | A1 * | 8/2013 | Meeker ................... | G06F 9/541 |
| | | | | 719/313 |
| 2016/0105319 | A1 * | 4/2016 | Meeker ............... | H04L 41/0846 |
| | | | | 709/204 |
| 2019/0014010 | A1 * | 1/2019 | Shevenell ........... | H04L 41/0895 |
| 2020/0099764 | A1 | 3/2020 | Bailey et al. | |
| 2022/0358281 | A1 * | 11/2022 | Gupta ................... | H04L 51/043 |
| 2024/0045827 | A1 * | 2/2024 | Li ........................... | H04L 12/66 |

FOREIGN PATENT DOCUMENTS

| | | |
|---|---|---|
| GB | 2644042 A | 3/2026 |
| WO | 2019/028415 A1 | 2/2019 |

OTHER PUBLICATIONS

International Searching Authority, "Notification of Transmittal of the International Search Report and the Written Opinion of the International Searching Authority, or Declaration," Patent Cooperation Treaty, Dec. 12, 2025, 08 pages, International Application No. PCT/IB2025/058192.

* cited by examiner

AUTOMATIC OPTIMIZATION OF REMOTE SERVICE REQUEST

BACKGROUND

An application programming interface (API) is a way for two or more computer programs to communicate with each other. A common protocol for transferring hypertext and data exchange over the internet is Hypertext Transfer Protocol (HTTP). HTTP operates as a request-response protocol in the client-server computing model. For example, a client, such as a web browser sends an HTTP request to a server, which processes the request and sends back an HTTP response, which includes status information and the requested content. The canonical format of an HTTP request refers to the standardized and well-defined structure that every HTTP request follows.

SUMMARY

According to the present invention there are provided a method, a system, and a computer program product according to the independent claims.

Viewed from a first aspect, the present invention provides a computer implemented method for communication between a sender and a receiver according to a communication protocol, the method comprising: the sender: generating a message for sending to the receiver; translating the message from a sender format used by the sender into a predetermined format dependent on the communication protocol; and sending the translated message to the receiver, the translated message comprising a map invitation; and the receiver: translating the translated message into a receiver format used by the receiver; and exchanging, a first map indicative of a mapping between a first format and the predetermined format; and the sender sending a subsequent message to the receiver in the first format.

Viewed from a further aspect, the present invention provides a system for communication between a sender and a receiver according to a communication protocol, the system comprising: the sender operable for: generating a message for sending to the receiver; translating the message from a sender format used by the sender into a predetermined format dependent on the communication protocol; and sending the translated message to the receiver, the translated message comprising a map invitation; and the receiver operable for: translating the translated message into a receiver format used by the receiver; and exchanging, a first map indicative of a mapping between a first format and the predetermined format; and the sender operable for sending a subsequent message to the receiver in the first format.

Viewed from a further aspect, the present invention provides a computer program product for communication between a sender and a receiver according to a communication protocol, the computer program product comprising a computer readable storage medium readable by a processing circuit and storing instructions for execution by the processing circuit for performing a method for performing the steps of the invention.

BRIEF DESCRIPTION OF THE DRAWINGS

The present invention will now be described, by way of example only, with reference to preferred embodiments, as illustrated in the following figures.

DETAILED DESCRIPTION

Figure 1:
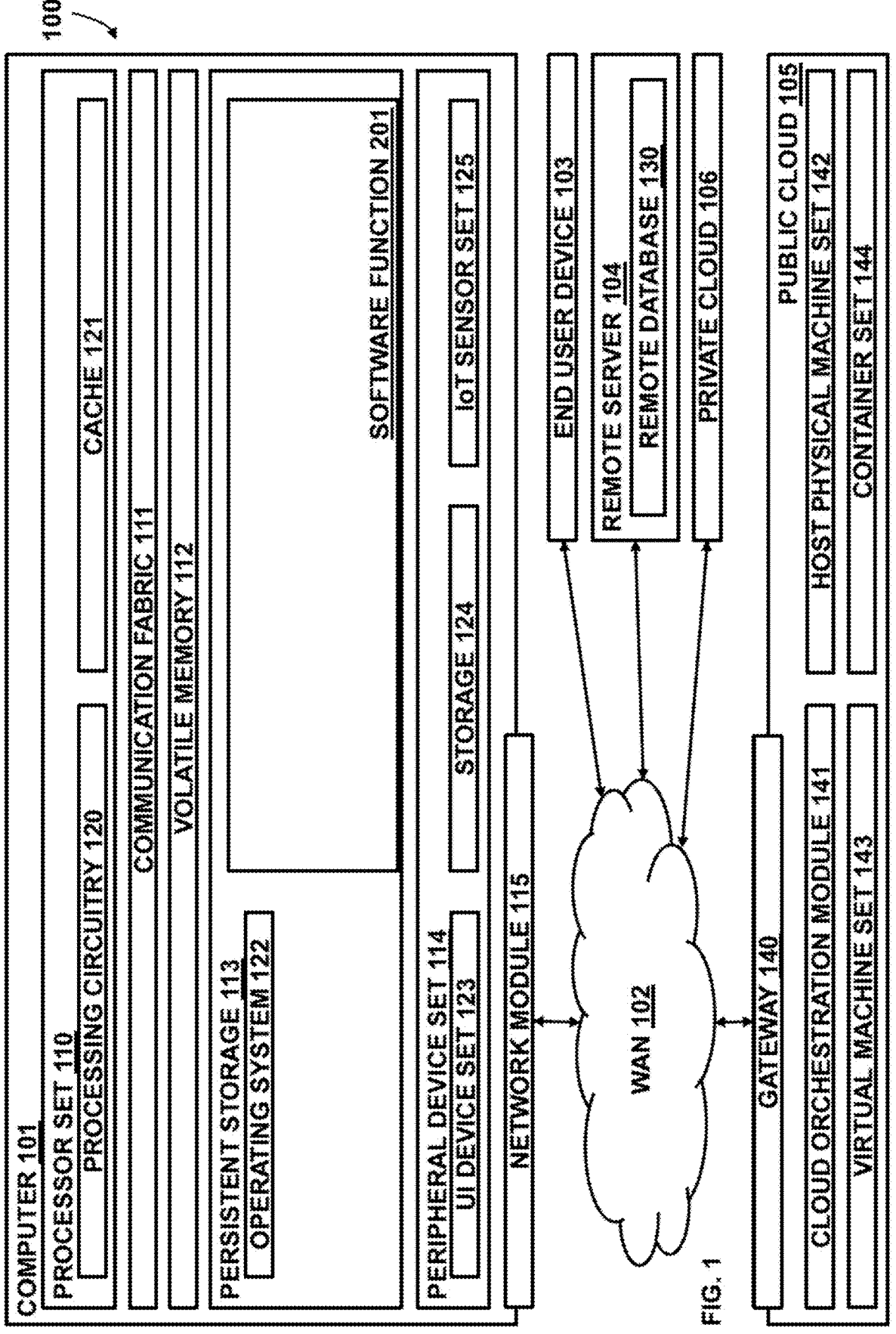
FIG. 1 depicts a computing environment 100, according to an embodiment of the present invention.

Information Technology (IT) solutions that involve API calls between clients and servers can spend a large amount of central processing unit (CPU) time mapping between their own internal formats and a common canonical format for communication, increasing expense and decreasing performance.

The canonical format may also be larger, or more complex, than is actually needed to communicate the information that needs to be exchanged, which increases input/output (I/O) cost and latency. This is true even when both client and server are using the same integration technology, with mapping to and from the canonical format on both ends.

Therefore, there is a need in the art to address the aforementioned problem.

Viewed from a further aspect, the present invention provides a computer program stored on a computer readable medium and loadable into the internal memory of a digital computer, comprising software code portions, when said program is run on a computer, for performing the steps of the invention.

Preferably, the present invention provides a method, system, computer program product and computer program, wherein exchanging comprises sending to the sender the first map, the first format comprising the receiver format.

Preferably, the present invention provides a method, system, computer program product and computer program, wherein sending the subsequent message comprises: generating the subsequent message for sending to the receiver; translating the subsequent message from the sender format into the receiver format using the first map; and sending the subsequent message to the receiver in the receiver format.

Preferably, the present invention provides a method, system, computer program product and computer program, wherein exchanging comprises receiving from the sender the first map, the first format comprises the sender format.

Preferably, the present invention provides a method, system, computer program product and computer program, wherein sending the subsequent message comprises: generating the subsequent message for sending to the receiver; sending the subsequent message to the receiver in the sender format; and translating the subsequent message from the sender format into the receiver format using the first map.

Preferably, the present invention provides a method, system, computer program product and computer program, wherein translating the subsequent message from the sender format into the receiver format comprises: translating the subsequent message from the sender format into the predetermined format using a second map indicative of a mapping between the sender format and the predetermined format; and translating the subsequent message from the predetermined format into the receiver format using the first map.

Preferably, the present invention provides a method, system, computer program product and computer program, further comprising generating a combined map indicative of a translation between the sender format and the receiver format; and wherein translating the subsequent message from the sender format into the receiver format comprises using the combined map.

Preferably, the present invention provides a method, system, computer program product and computer program, wherein generating the combined map is carried out in the background.

Preferably, the present invention provides a method, system, computer program product and computer program, wherein generating the combined map comprises analyzing sub-structures of the first and second maps to produce a minimal function that maps elements required in an output schema of the combined map.

Preferably, the present invention provides a method, system, computer program product and computer program, wherein an element used in only one of the first map and second map is removed from the combined map.

Preferably, the present invention provides a method, system, computer program product and computer program, wherein the communication protocol is HTTP.

Advantageously, the present invention allows all existing message flows to work as before, but can work faster/cheaper when both sides are using integration products enabled with this disclosure. However, the invention allows for transparent exchange for the flow writer, and optimization of maps and the associated change of formats.

Advantageously, the client and server can communicate in a way that allows one of them to do both mappings to avoid sending the large canonical format. In addition, once one side has both maps, they can be combined into a single, more efficient, map that skips the canonical format entirely.

Advantageously, running separate or combined maps on the client has the benefit of reducing the amount of CPU that the server-side does, which could reduce the CPU cost charged back to the user. The client will be able to send a minimal payload in the request, which will reduce network I/O cost.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100. Computing environment 100 contains an example of an environment for the execution of at least some of the computer code involved in performing the inventive methods, such as software functionality 201 for improved processing of messages. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods, for example in the client functionality 1200, and/or the server functionality 1300.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

IBM® App Connect is an integration platform that enables organizations to connect applications, data, and systems across various environments. It allows for the automation of workflows and the orchestration of business processes. IBM is a trademark of International Business Machines Corporation, registered in many jurisdictions worldwide.

API Management enables the creation, management, and securing of APIs to allow different systems to communicate. API Integration exposes internal systems and data as APIs to allow third-party developers and partners to build on top of existing services.

Workflow Automation automates business processes by creating workflows that trigger actions across different systems based on predefined conditions.

In the context of HTTP, a map is a data structure or object that represents key components of an HTTP message:

a. A request map for an HTTP request is a structure that represents the key components of the request. This includes information such as headers, parameters, and possibly the body of the request. It provides a way to organize and access the details of an HTTP request programmatically. It provides a convenient way to access and manipulate request data within web applications and frameworks, facilitating request processing, logging, routing, and testing.

b. A response map represents an HTTP response with the key components that a server sends back to the client.

c. An input map is a structured representation of all the inputs received as part of an HTTP request.

d. A reply map is a structured representation of all the inputs received as part of an HTTP response.

Although depicted as tables, for illustration purposes, maps can be expressed in a functional language, either by direct coding, or by code generation from a graphical UI.

International standards exist for information exchange, integration, sharing, and retrieval. For example:

HL7: Used for exchange, integration, sharing, and retrieval of electronic health information.

ISO 8583: Financial transaction card originated messages—Interchange message specifications. Used for credit and debit card transactions.

ISO/IEC 27002: Code of practice for information security controls. Provides guidelines for organizational information security standards and practices.

ISO/IEC 20000: Information technology—Service management. Includes standards for managing and delivering IT services, including the transfer of information.

ISO/IEC 9735: Electronic data interchange for administration, commerce, and transport (EDIFACT). The international standard for electronic data interchange (EDI).

ISO 11783: Tractors and machinery for agriculture and forestry—Serial control and communications data network. Focuses on the transfer of information in the agriculture and forestry sectors.

ISO/IEC 9735: Electronic data interchange for administration, commerce, and transport (EDIFACT)—Application level syntax rules.

ISO 11898: Road vehicles—Controller area network (CAN). Standard for vehicle data transfer.

ISO 19115: Geographic information—Metadata. Standard for describing digital geographic data.

ISO/IEC 7816: Identification cards—Integrated circuit cards. Defines the standards for smart cards.

ISO/IEC 14443: Identification cards—Contactless integrated circuit cards—Proximity cards. Standard for contactless smart cards.

ISO/IEC 18092: Information technology—Telecommunications and information exchange between systems— Near Field Communication—Interface and Protocol (NFCIP-1). Standard for NFC communication.

These standards ensure reliable, secure, and efficient information transfer across different sectors and use cases. They provide the necessary frameworks and protocols for seamless communication and data exchange.

Not all of these standards inherently involve HTTP. For example, ISO 11783 uses CAN (Controller Area Network) as its physical layer, but if there's a need to interface ISO 11783 data with web-based systems or transfer data using HTTP, the ISO 11783 messages can be encapsulated in an HTTP format. Due to standardization, such canonical forms of HTTP messages are complex.

For illustration purposes only, embodiments of the present invention will be described using the ISO 11783 standard, the HTTP protocol, scenarios, maps and messages. The skilled person would understand that the canonical form could follow another standard, another client-server protocol could be used, and that other structures could be used.

Standards are integral to an industry's efforts to achieve interoperability for consistent information exchange, to guarantee that different systems can work together effectively. An important use of the technology is in the use of messages to control production lines.

Figure 2:
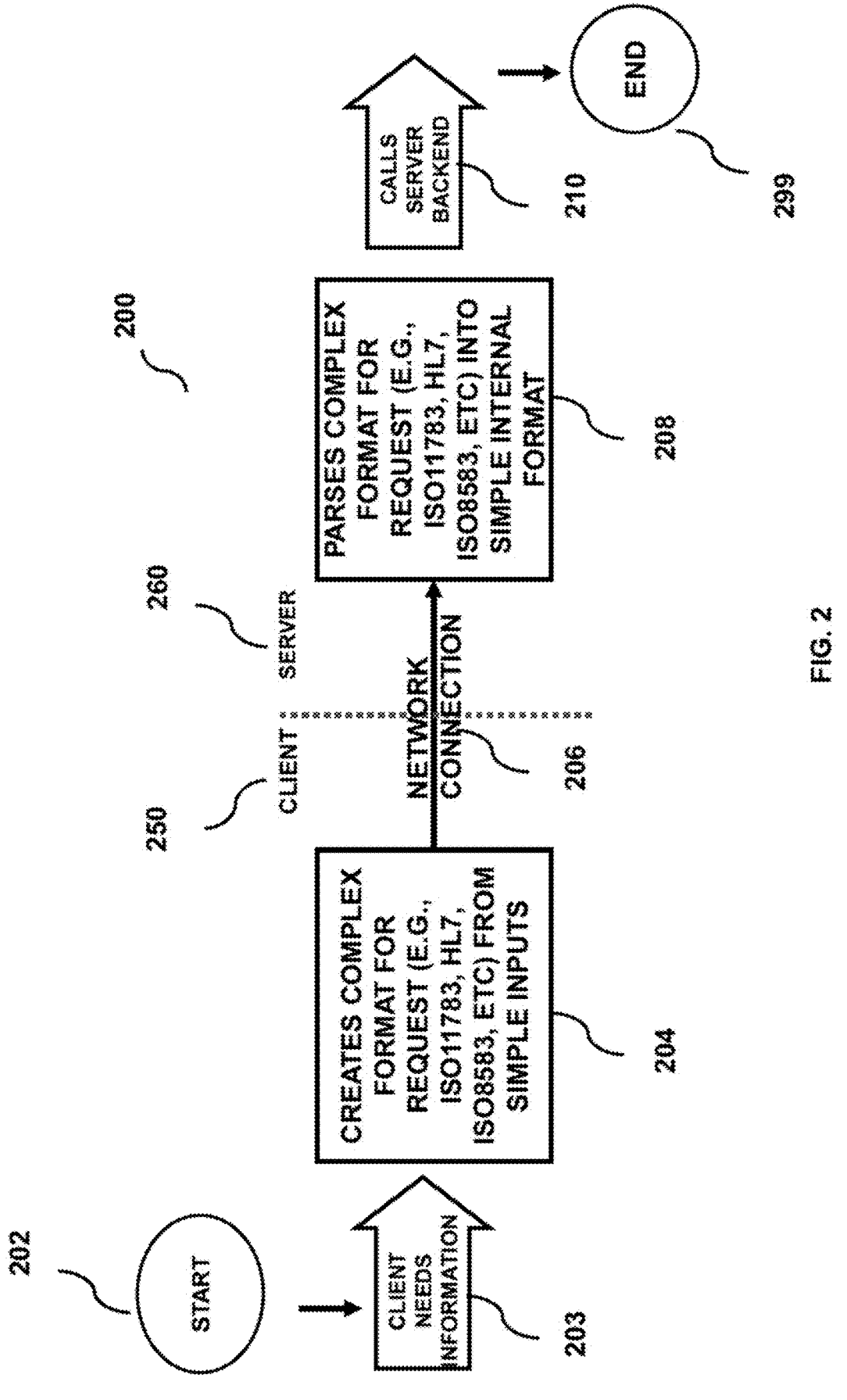
FIG. 2 depicts a high-level exemplary schematic flow diagram 200 depicting operation method steps for a client to request data from a server, in accordance with the prior art.
Figure 3:
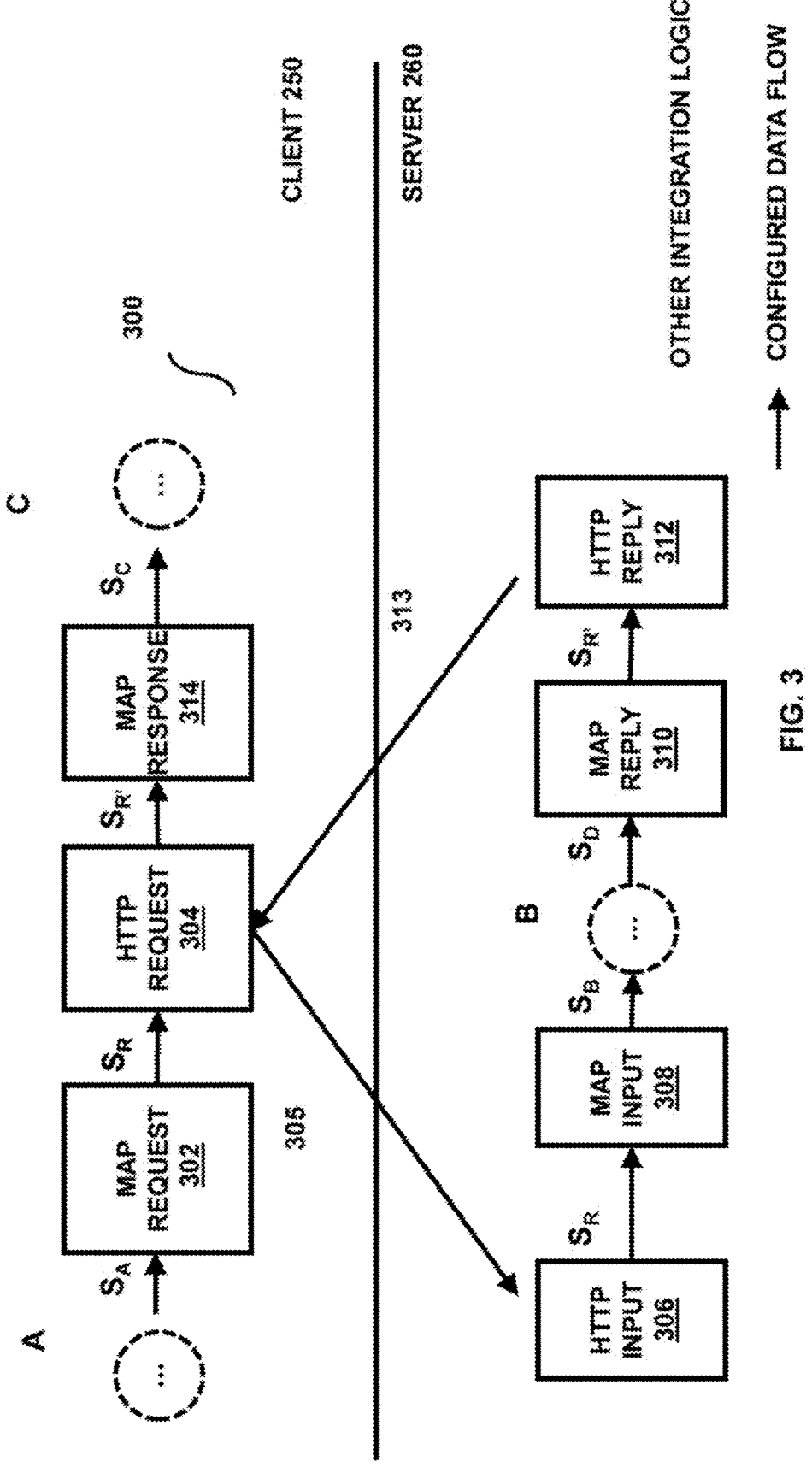
FIG. 3 depicts a high-level exemplary schematic flow diagram 300 depicting operation method steps for the client to request and receive data from the server, in accordance with the prior art.
Figure 10:
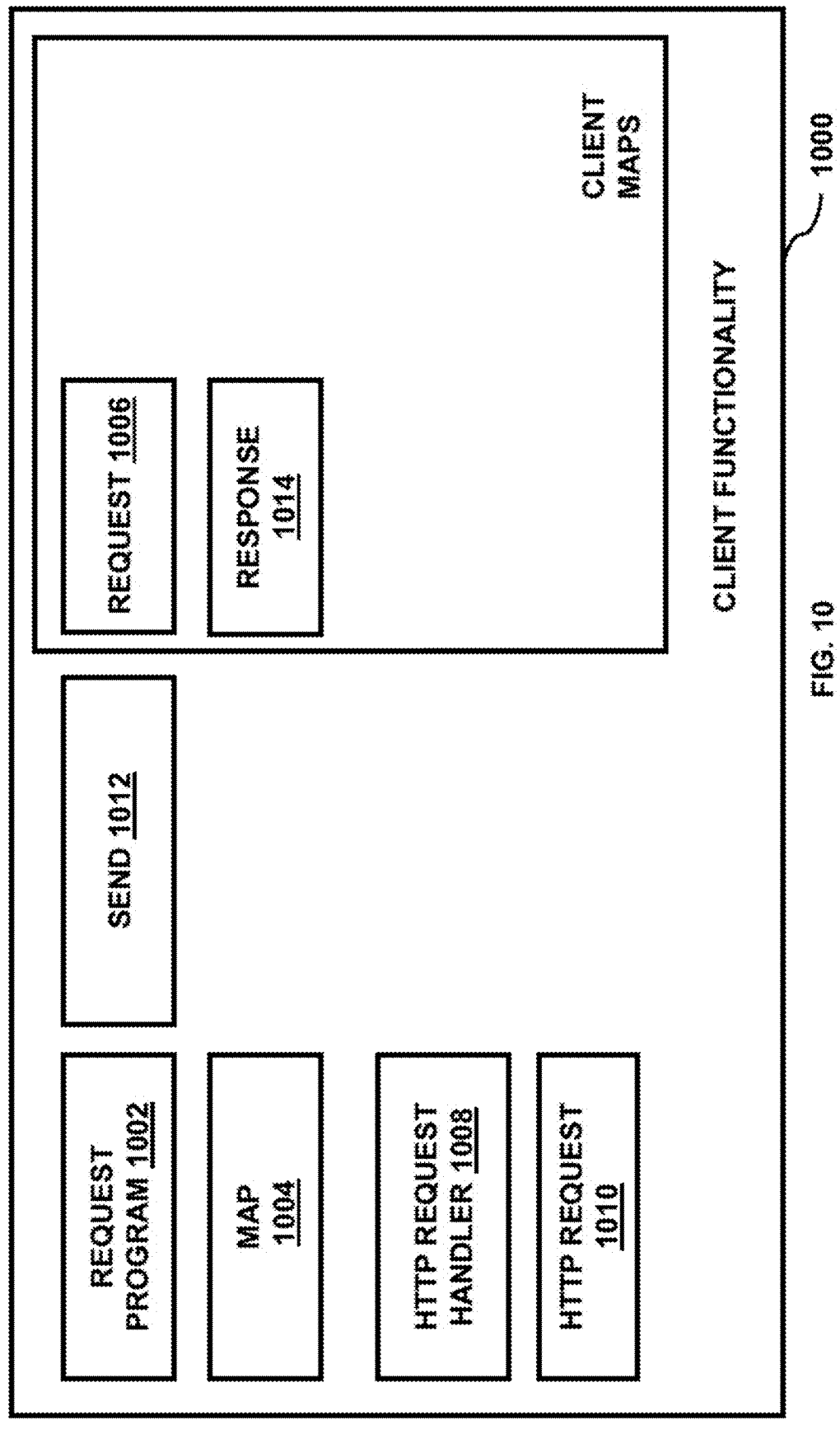
FIG. 10 depicts software components 1000 used by a client, in accordance with the prior art.
Figure 11:
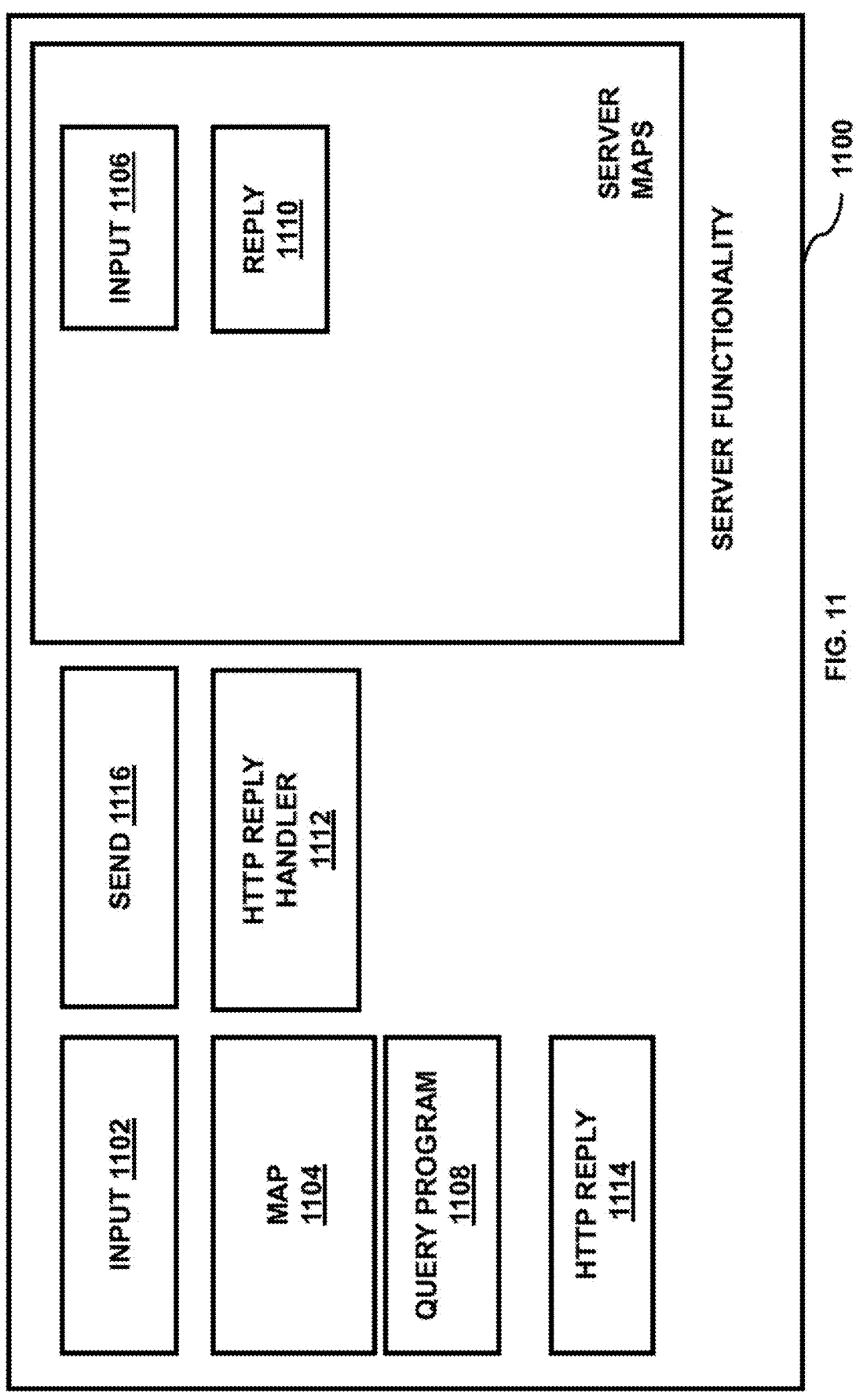
FIG. 11 depicts software components 1100 used by a server, in accordance with the prior art.

FIG. 2, which should be read in conjunction with FIGS. 3, 10 and 11, depicts a high-level exemplary schematic flow diagram 200 depicting operation method steps for a client 250 to request data from a server 260, in accordance with the prior art.

FIG. 3 depicts a high-level exemplary schematic flow diagram 300 depicting operation method steps for the client 250 to request and receive data from the server 260, in accordance with the prior art.

FIG. 10 depicts software components 1000 used by the client 250, according to a preferred embodiment of the present invention. FIG. 11 depicts software components 1100 used by a server 260, in accordance with the prior art.

FIG. 2 depicts a basic method for a client 250 to request information from a server 260. The method starts at step 202. At step 203 a client 250 needs information from a server 260. At step 204, the client 250, creates a complex format for a request from simple inputs. At step 206, the client 250, sends the request over a network connection 206 to the server 260. At step 208, the server 260 receives the request, parsing the complex format and translating the contents of the request into a simple internal format. At step 210, the server 260 calls the server backend. At step 299, the method ends.

FIG. 3 depicts existing client 250 and server 260 interactions. Existing client 250 and server interactions are typically part of a workflow comprising other integration logic, depicted as A, B and C. As an example, to illustrate the client/server interactions, the client 250 requests information from server 260. At step A, a client request program 1002 creates a message Message (SA). The information requested is that of the model of vehicle 'machine-ABCDE'. The client 250 executes the client request program 1002 in a client format SA with the following parameters:

TABLE 1

| Values of variables in client format SA |
| --- |
| Name of machine: MACHINE-ABCDE |
| Time: now |
| Importance: level 3 |
| Data: 'Request model of <machine>' |

At each mapping step, a map component 1004, 1104, uses a map to map an input in one format to an output in another format. At step 302, a client map component 1004 maps from the client format SA to a canonical format SR using an HTTP request map 1006. Message (SA) is translated into Message (SR). Using the same example, the HTTP request map to send ISO 11783 data is as follows:

TABLE 2

| Request map 1006 | |
| --- | --- |
| $S_A$ (client format) | $S_R$ (canonical format) |
| Name of machine: | deviceId |
| Time | timestamp |
| Importance: [1, 2, 3, 4, 5] | priority: [1, 2, 3, 4, 5] |
| null | PGN |
| address | sourceAddress |
| null | destinationAddress |
| Data | data |

Note that the canonical format SR of the request map 1006 as more parameters than that of the client request program 1002 in SA format. The request map defines the structure of the HTTP request 1010, detailing the HTTP method, URL, headers, and the body content. This ensures that any client 250 interacting with the API understands exactly what information needs to be provided and how it should be formatted.

At step 304, a client HTTP request handler component 1008 prepares an HTTP request 1010, based on the parameters in canonical format SR as follows:

TABLE 3

| HTTP request 1010 |
| --- |

```
POST /sendISO11783Data HTTP/1.1
Host: abc.example.com
Content-Type: application/json
Content-Length: 348
{
   "deviceId": "MACHINE-ABCDE",
   "timestamp": "2024-07-16T10:35Z",
   "iso11783Message": {
      "priority": 3,
      "PGN": 61444,
      "sourceAddress": 31,
      "destinationAddress": 255,
      "data": "0x123456789ABCDEF0"
   }
}
Key:
Method: POST is used here to send data to the server.
URL: /sendISO11783Data is the endpoint on the server where the data will be sent.
Headers:
      Host: Specifies the domain name of the server.
      Content-Type: Indicates that the body of the request is in JSON format.
      Content-Length: Indicates the length of the body content.
```

TABLE 3-continued

| HTTP request 1010 |
| --- |

Body: Contains the actual ISO 11783 data encapsulated in a JSON object. This includes:
    a. deviceId: An identifier for the machine.
    b. timestamp: When the data was recorded.
    c. iso11783Message: The ISO 11783 message data, including:
        i.    priority: Message priority.
        ii.   PGN: Parameter Group Number, identifying the type of message.
        iii.  sourceAddress: The address of the sender.
        iv.  destinationAddress: The address of the receiver (255 typically means broadcast).
        v.   data: The actual data payload of the message in hexadecimal format.

At step 305, a client send component 1012 sends the HTTP request 1010 to the server 260. At step 306, a server input component 1102 inputs the HTTP request 1010, which is in the canonical form SR.

At step 308, a server map component 1104 maps the HTTP request 1010 from the canonical format SR to a server format SB based on an input map 1106: Message (SR) is translated into Message (SB). A server query program 1108, which handles the client request, uses the variables and parameters from the server format SB in the other integration logic of the workflow B. As an example, the input map in format SB appears with the following parameters:

TABLE 4

| Input map 1106 | |
| --- | --- |
| $S_R$ (canonical format) | $S_B$ (server) |
| "deviceId": | null |
| "timestamp": | Time: |
| "priority": [1, 2, 3, 4, 5,] | Importance: [A, B, C, D, E]: |
| "PGN": | null |
| "sourceAddress": | null |
| "destinationAddress": 255, | null |
| "data": | Instruction [parms] |

As requested, the workflow B carries out a query to provide the model of vehicle.

At step 310 the server map component 1104 maps the output of workflow B with format SD based on a reply map 1110 with canonical format SR': Answer (SB) is translated into Answer (SR'). As an example, the reply map 1110 appears with the following parameters:

TABLE 5

| Reply map 1110 | |
| --- | --- |
| $S_D$ (server) | $S_{R'}$ (canonical format) |
| success | status |
| null | message |
| null | id |
| Time | processedTimestamp |
| RequestedData | metric1 |

At step 312, an HTTP reply handler component 1112 translates the output from the reply map step 310 into an HTTP reply 1114. The HTTP reply 1114 appears as following:

TABLE 6

| HTTP reply SR' 1114 |
| --- |

HTTP/1.1 200 OK
Content-Type: application/json

TABLE 6-continued

| HTTP reply SR' 1114 |
| --- |

Date: Tues, 17 Jul 2024 10:35 GMT
X-Request-ID: abc123
Format: $S_{R'}$
{
  "status": "success",
  "message": "Data processed successfully.",
  "data": {
    "id": "12345",
    "processedTimestamp": 2024-07-16T10:35Z ",
    "results": {
      "metric1": 'Tractor - model C'
    }
  }
}

At step 313, a server send component 1116 sends the HTTP reply 1114 to the client HTTP request handler component 1008.

At step 314, the client map component 1004 maps from the canonical format SR' to a client format Sc based on a response map 1014: Answer (SR') is translated into Answer (SC).

TABLE 7

| Response map 1014 | |
| --- | --- |
| $S_{R'}$ (canonical format) | $S_C$ (client) |
| status | ErrorCode |
| message | null |
| id | MachineAddress |
| processedTimestamp | Date: Time |
| metric1 | RegistrationNumber |
| | Message: ""Model of" "deviceId" "is" <ModelType> |

After step 314 the client request program 1002 uses values of variables ErrorCode, MachineAddress, Date:Time, and RegistrationNumber in its further workflow C, processing the result of the query ('Tractor-model C'). Method 300 ends.

Client-Side Map Processing

Figure 4A:
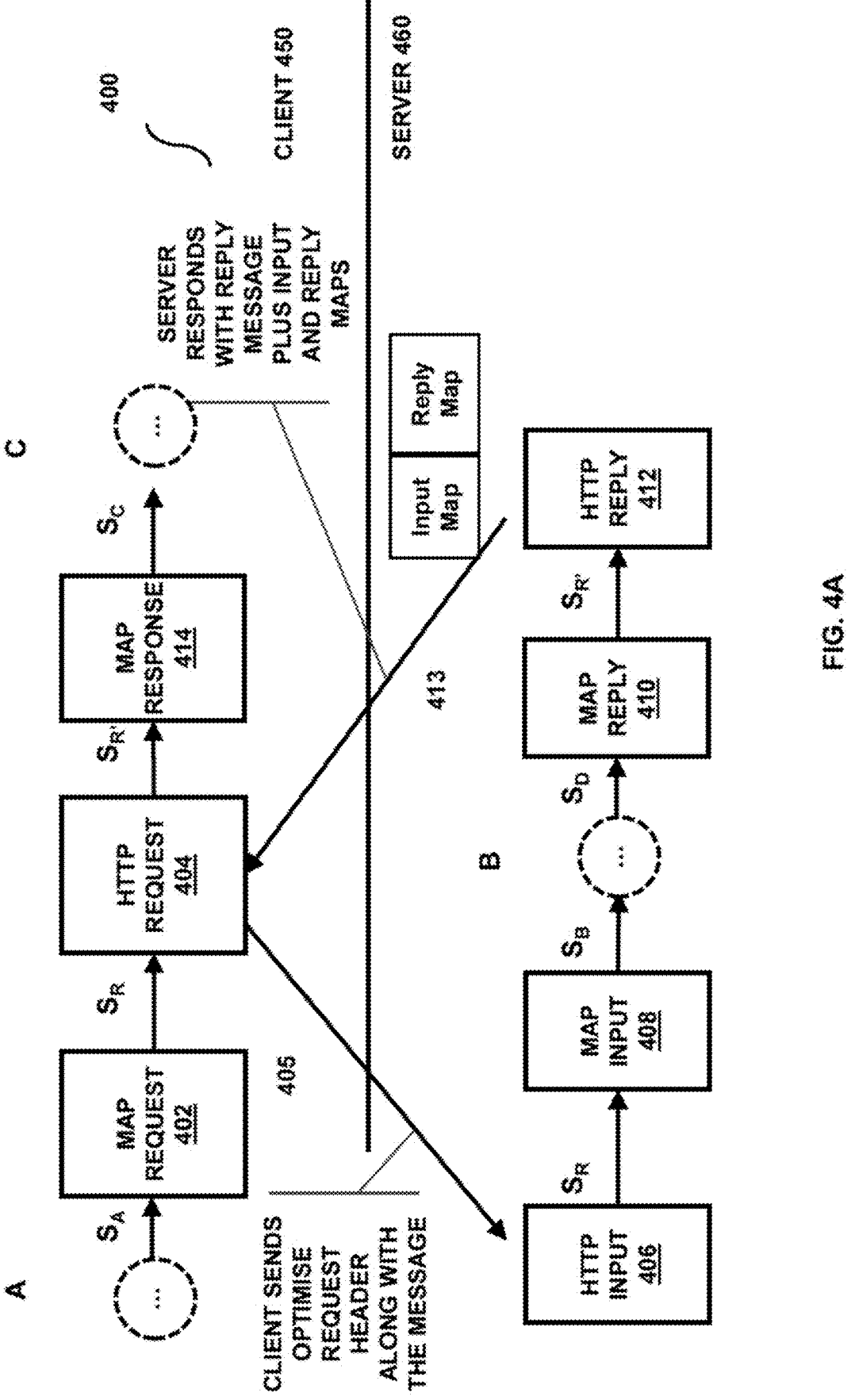
FIG. 4A depicts a high-level exemplary schematic flow diagram 400 depicting operation method steps for a client to request and receive data from a server, according to an embodiment of the present invention.

FIG. 4A, which should be read in conjunction with FIGS. 4B, 5, 6, 12 and 13, depicts a high-level exemplary schematic flow diagram 400 depicting operation methods steps for a client 450 to request and receive data from a server 460, according to an embodiment of the present invention.

Figure 4B:
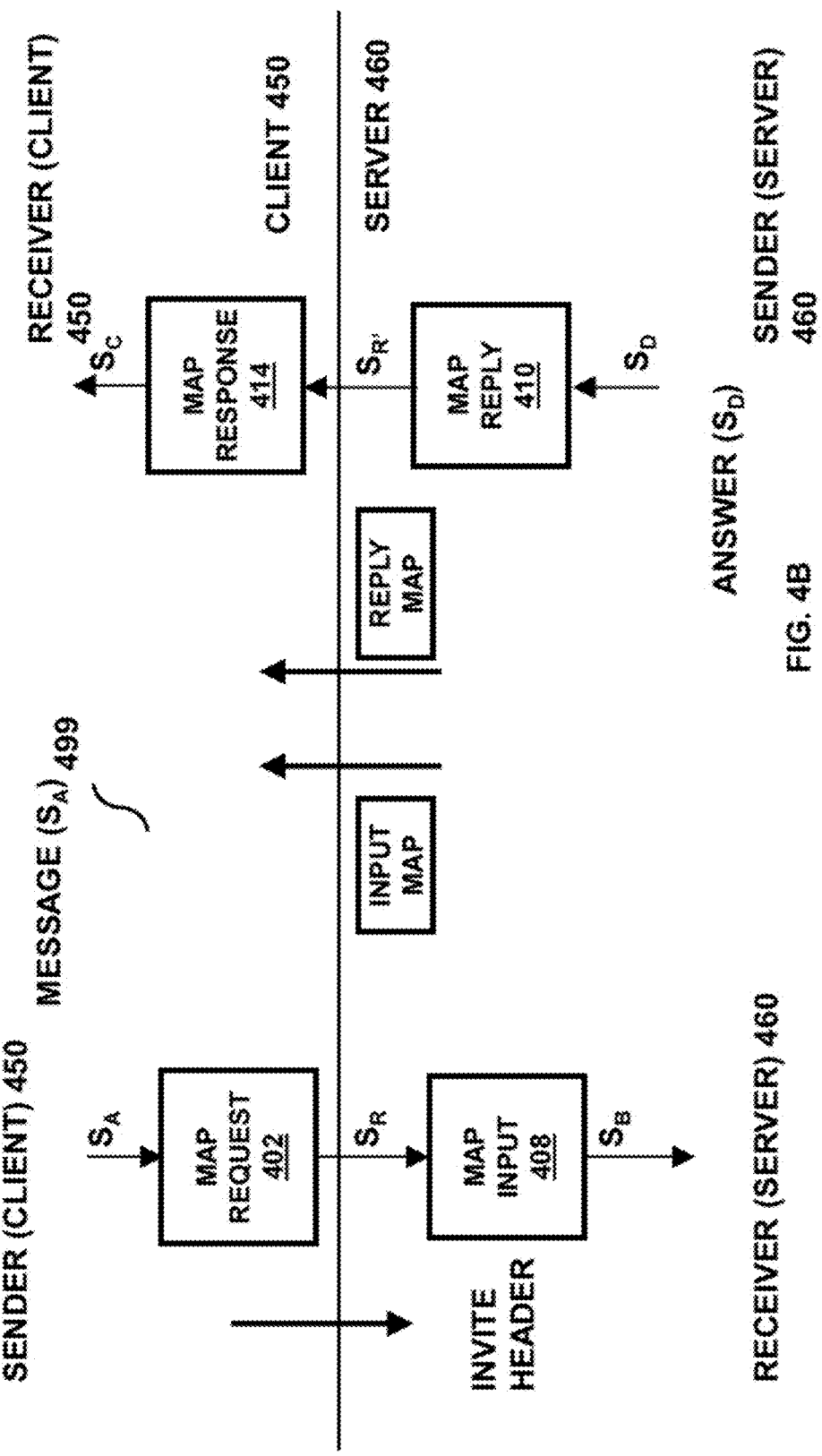
FIG. 4B depicts a high-level exemplary schematic flow diagram 499 depicting the map step operations of FIG. 4A, according to an embodiment of the present invention.

FIG. 4B depicts a high-level exemplary schematic flow diagram 499 depicting the map step operations of FIG. 4A. For Message (SA), the client 450 acts as sender, and the server 460 acts as receiver. For Answer (SD), the server 460 acts as sender, and the client 450 acts as receiver.

Figure 5A:
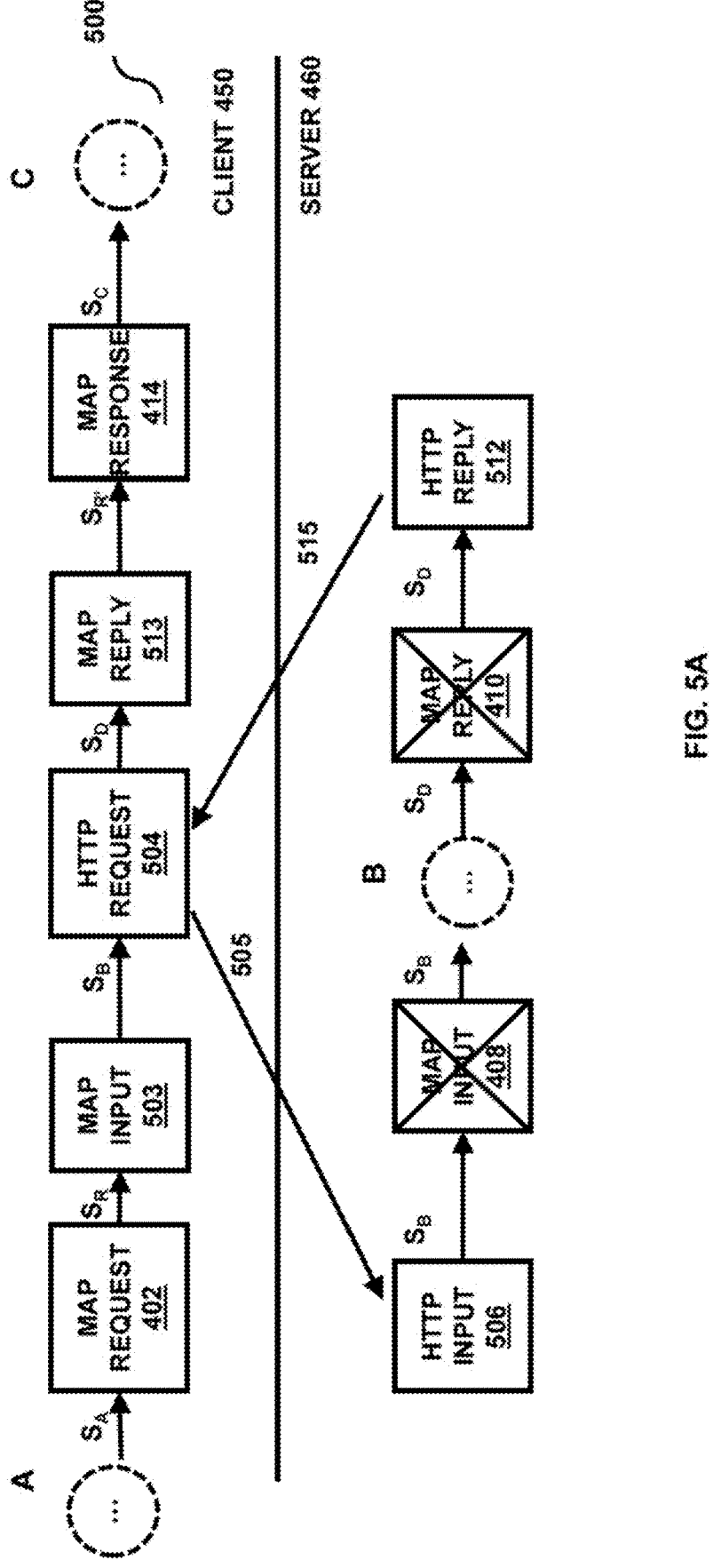
FIG. 5A also depicts a high-level exemplary schematic flow diagram 500 depicting operation method steps for the client to request and receive data from the server, according to an embodiment of the present invention.

FIG. 5A also depicts a high-level exemplary schematic flow diagram 500 depicting operation methods steps for the client 450 to request and receive data from the server 460, according to an embodiment of the present invention.

Figure 5B:
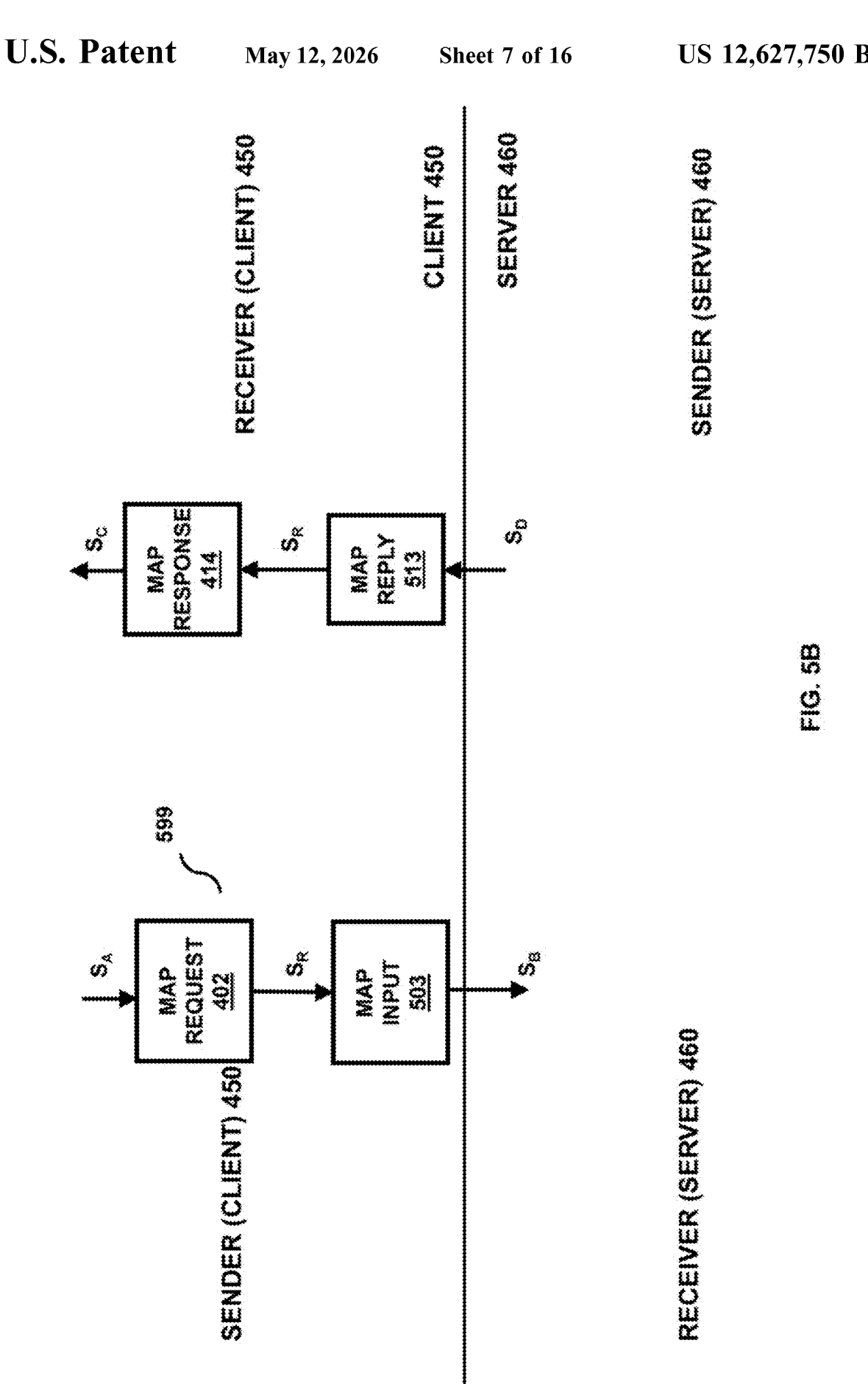
FIG. 5B depicts a high-level exemplary schematic flow diagram 599 depicting the map step operations of FIG. 5A, according to an embodiment of the present invention.

FIG. 5B depicts a high-level exemplary schematic flow diagram 599 depicting the map step operations of FIG. 5A.

Figure 6:
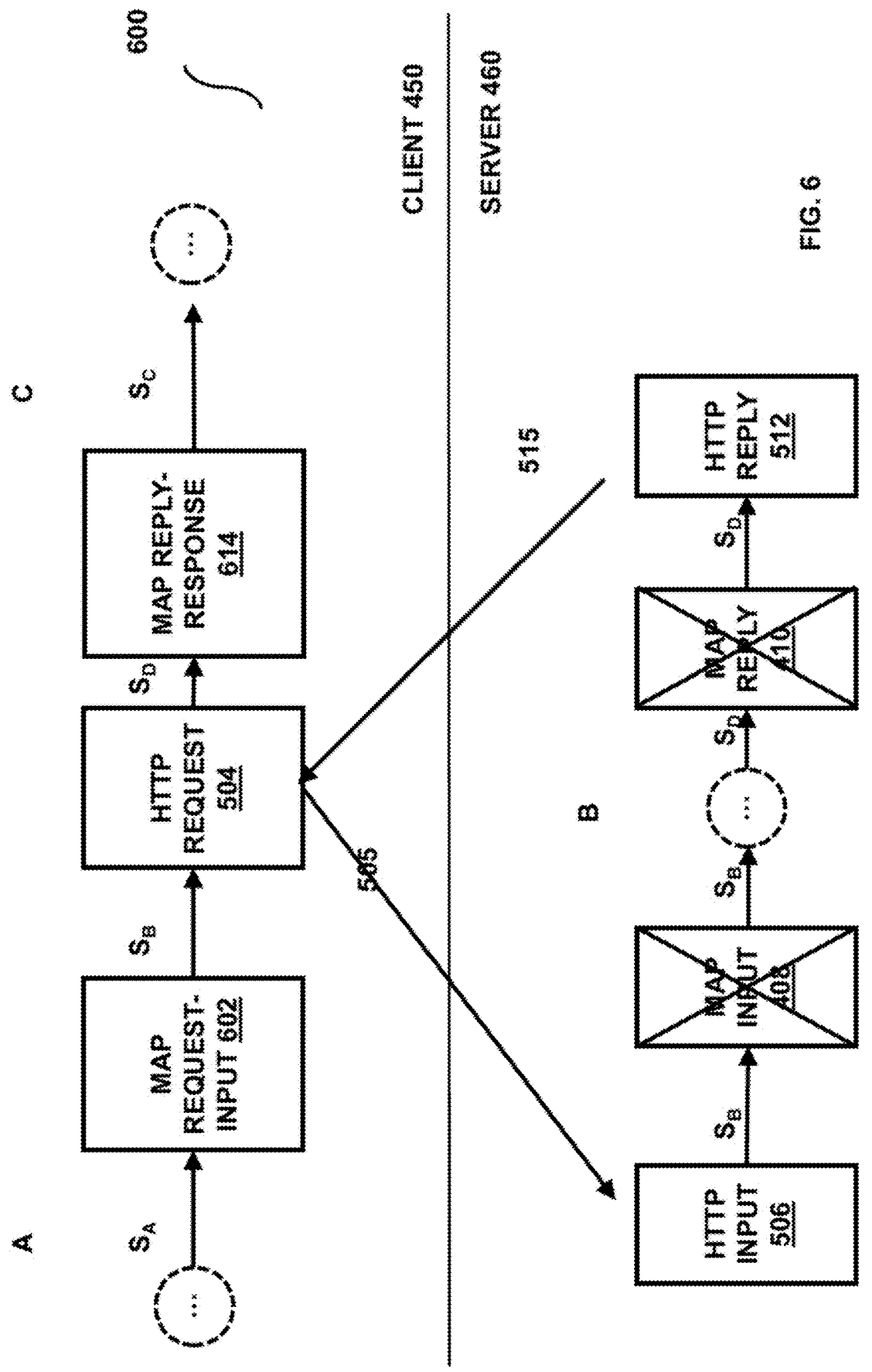
FIG. 6 also depicts a high-level exemplary schematic flow diagram 600 depicting operation method steps for the client to request and receive data from the server, according to an embodiment of the present invention.

FIG. 6 also depicts a high-level exemplary schematic flow diagram 600 depicting operation methods steps for the client 450 to request and receive data from the server, 460 according to an embodiment of the present invention.

Figure 12:
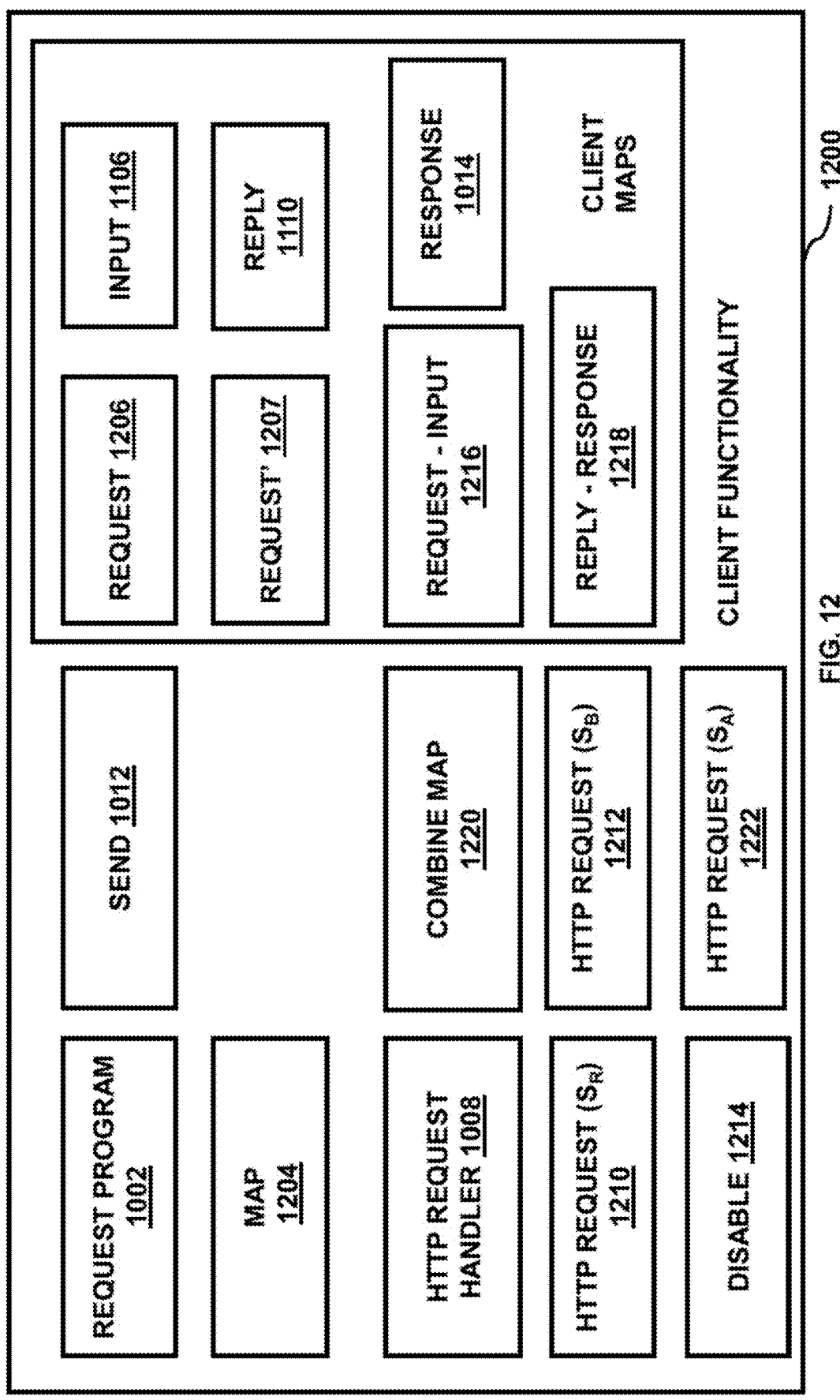
FIG. 12 depicts software components 1200 used by a client, according to an embodiment of the present invention.
Figure 13:
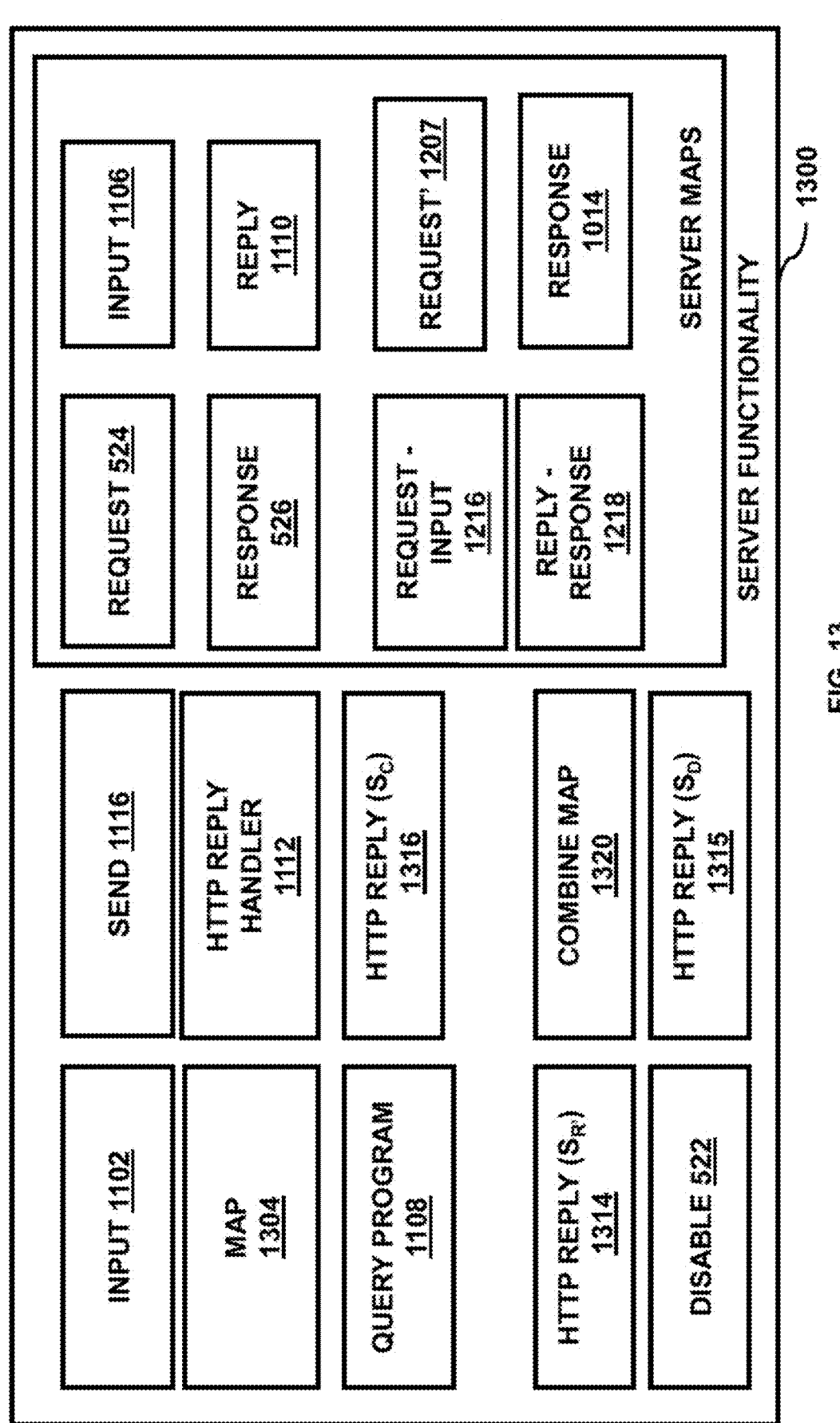
FIG. 13 depicts software components 1300 used by a server, according to an embodiment of the present invention.

FIG. 12 depicts software components 1200 used by a client 450, according to an embodiment of the present invention. FIG. 13 depicts software components 1300 used by a server 460, according to an embodiment of the present invention.

Note that client 450 and server 460 are enhanced versions of client 250 and server 460, respectively. Common software components are referenced by the same number, for example, client request program 1002 is common between client 250 and client 450.

FIG. 4A depicts an initial handshake between the client 450 and server 460. In this embodiment, the client 450 requests the maps 1206, 1014 used by the server 460. The initial request to the server 460 follows the method of FIG. 3, except that the HTTP request 1210 comprises an additional header that comprises a 'RequestHandShake' header along with the message. The 'RequestHandShake' header represents a request to optimize map processing. If acceptable to the server 460, the HTTP reply 1314 comprises a reply to the request along input map 1306 and reply map 1310 to use on subsequent requests.

Messages after the first one can be optimized as long as the formats do not change. Renegotiation would be needed in that case.

Using the same example as used for FIG. 3, the client 450 executes the client request program 1002 in the client format SA to create Message (SA).

At step 402, a client map component 1204 maps from the client format SA to a canonical format SR based on a request map 1206:

TABLE 8

| Request map 1206 | |
|---|---|
| $S_A$ (client format) | $S_R$ (canonical format) |
| H: OptimizeMaps | H: RequestHandShake |
| Name of machine: | deviceId |
| Time | timestamp |
| Importance: [1, 2, 3, 4, 5] | priority: [1, 2, 3, 4, 5] |
| null | PGN |
| address | sourceAddress |
| null | destinationAddress |
| Data | data |

Note that the request map 1206 is similar to request map 1006, except or a header "OptimizeMaps"/"RequestHand-Shake".

At step 404, a client HTTP request handler component 1208 prepares an HTTP request 1210, based on the parameters in canonical format SR. The HTTP request 1210 is similar to HTTP request 1010, except for an additional header "RequestHandShake":

TABLE 9

| HTTP request 1210 |
|---|
| POST /sendISO11783Data HTTP/1.1 |
| Host: abc.example.com |
| Content-Type: application/json |
| Content-Length: 348 |
| RequestHandShake: 1 |
| { |
|   "deviceId": |
|     ........ |
|     "data": "0x123456789ABCDEF0" |
|   } |
| } |

At step 405, the client send component 1012 sends the HTTP request 1210 to the server 460. At step 406, a server input component 1102 inputs the HTTP request 1210, which is in the canonical form SR. Server code interprets the HTTP request 1210 understanding 'RequestHandShake: 1' to mean that the client 450 is requesting an optimization of maps.

At step 408, a server map component 1304 maps the HTTP request 1210 from the canonical format SR to a server format SB based on the input map 1106. The server query program 1108, which handles the client request, uses the variables and parameters from the server formal SB in the other integration logic of the workflow B. As in the method of FIG. 3, the workflow B carries out a query to provide the model of the vehicle ('Tractor-model C').

At step 410 the server map component 1304 maps the output of workflow B with format SD based on the reply map 1110.

At step 412, an HTTP reply handler component 1312 translates the output from the reply map step 410 into an HTTP reply 1314. HTTP reply 1314 is again similar to the HTTP reply 1114, except that it contains an additional header "OptimizeAccept", and links to input map 1106, and reply map 1110.

TABLE 10

| HTTP reply 1314 |
|---|
| HTTP/1.1 200 OK |
| Content-Type: application/json |
| OptimizeAccept: 1 |
| Format: $S_{R'}$ |
| InputMap: <file InputMap> |
| ReplyMap: <file ReplyMap> |
| Date: Tues, 17 Jul 2024 10:35 GMT |
| X-Request-ID: abc123 |
| { |
|   ......... } |

At step 413, the server send component 1116 sends the HTTP reply 1314 to the client HTTP request handler component 1208, along with the input map 1106 and reply map 1110. The HTTP reply 1314 (multi-part MIME, for example) in format SR' comprises:

a. the input map (base64 encoded) 1106;

b. the reply map (base64 encoded) 1110; and c. the new header information that was created for optimized processing.

At step 414, the client map component 1204 maps from the canonical format SR' to a client format Sc based on the response map 1014.

After step 414 the client request program 1002 processes the result of the query Answer (SC) ['Tractor-model C'] in further aspects of its workflow C. The initial handshake method 400 ends.

FIG. 5A also depicts a high-level exemplary schematic flow diagram 500 depicting operation methods steps for the client 450 to request and receive data from the server 460, according to an embodiment of the present invention. FIG. 5 depicts method steps 500 for interactions following the initial handshake depicted in FIG. 4. In the method 500 of FIG. 5, the client 450 processes all maps 1206, 1106, 1110, 1014. The client 450 maps from client format SA to the server format SB via the canonical SR before calling the server 460. The server 460 knows it has received the server format SB and disables the input map 1106, and the reply map 1110 as replies in SD format will be sent back to the client 450.

Using the same example as used for FIG. 4, the client 450 executes the client request program 1002 in the client format SA. For the next request, the client 450 is interested in the registration number of vehicle 'Tractor-model C'.

At step 402, the client map component 1204 maps from the client format SA to a canonical format SR based on a request map 1206.

At step 503, the client map component 1204 maps from the canonical format SR to the server format SB based on the input map 1106 received from the server 460 during the handshake method of FIG. 4, described above.

At step 504, the client HTTP request handler component 1208 prepares an HTTP request 1212. The HTTP request 1212 is similar to HTTP request 1210, but is in SB format.

TABLE 11

| HTTP Request SB 1212 |
| --- |
| POST /sendData HTTP/1.1<br>Host: abc.example.com<br>Content-Type: application/json<br>Format: $S_B$<br>{<br>  "Time": "2024-07-16T12:35Z",<br>  "iso11783Message": {<br>    "Importance": C,<br>    "Instruction": "0x0987654321ABCDEF00"<br>  }<br>} |

At step 505, the client send component 1012 sends the HTTP request 1212 to the server 460. At step 406, the server input component 1102 inputs the HTTP request 1212, which is in server format SB. Server code interprets the HTTP request 1212 and recognizes that the HTTP request 1212 is already in the server format SB, Consequently, a server disable component 1214, disables the input map step 408, and reply map step 410.

The server query program 1108, which handles the client request, uses the variables and parameters from the HTTP request 1212 in the other integration logic of the workflow B. As requested, the workflow B carries out a query to provide the registration number of the machine ('AB24 CDE').

At step 512, the HTTP reply handler component 1312 translates the output from the workflow B into an HTTP reply 1315. HTTP reply 1315 is similar to HTTP reply 1314, except that HTTP reply 1315 is in format SD.

TABLE 12

| HTTP reply SD 1315 |
| --- |
| HTTP/1.1 200 OK<br>Content-Type: application/json |

TABLE 12-continued

| HTTP reply SD 1315 |
| --- |
| OptimizeAccept: 1<br>Format: $S_D$<br>Date: Tues, 17 Jul 2024 125:35 GMT<br>X-Request-ID: abc123<br>{<br>    ......... } |

At step 515, the server send component 1116 sends the HTTP reply 1315 to the client HTTP request handler component 1208. At step 414, the client map component 1204 maps from the canonical format SR' to a client format Sc based on the response map 1014.

At step 513, the client map component 1204 maps from the server format SD to the canonical format SR' based on the reply map 1110.

At step 414, the client map component 1204 maps from the canonical format SR' to a client format Sc based on the response map 1014.

After step 414 the client request program 1002 processes the result of the query ('AB24 CDE') in further aspects of its workflow C. Method 500 ends.

FIG. 6 also depicts a high-level exemplary schematic flow diagram 600 depicting operation methods steps for the client 450 to request and receive data from the server 460, according to an embodiment of the present invention. In an alternative embodiment FIG. 6 depicts method steps 600 for interactions following the initial handshake depicted in FIG. 4. In the method 600 of FIG. 6, the client 450 runs combined maps 1216, 1218. The client 450 uses the maps 1106, 1110 from the server 460 combined with the client maps 1206, 1014 to create new maps 1216, 1218 that convert directly between the formats SA, SB, SD, SC used by the flows A, B, C without needing the canonical formats SR, SR'. Advantageously, the combined maps 1216, 1218 can be more efficient than the original two maps 1206+1106, 1110+1014 executed sequentially.

Maps can be combined, in a number of ways.

One way is by applying the second function to the result of applying the first function to the data.

Another way is by analyzing the sub-structures of the maps, in combination with the schemas to produce a minimal function that maps the elements required in the output schema. For example, for a particular data element, a string (or numeric) operation in the first map followed by a string (or numeric) operation in the second map could be combined into a single operation in the combined map. If an element that gets transformed in in the first map is not subsequently used in the second map, that part of the mapping can be removed entirely from the combined map.

At step 602, a client combine map component 1220 combines the request map 1206 and the input map 1106 to produce a request-input map 1216.

TABLE 13

| Request-Input map 1216 | |
| --- | --- |
| $S_A$ (client format) | $S_B$ (server) |
| OptimizeMaps | null |
| Name of machine: | null |
| Time | Time: |
| Importance: [1, 2, 3, 4, 5] | Importance: [A, B, C, D, E]: |
| null | null |
| address | null |

TABLE 13-continued

| Request-Input map 1216 | |
| --- | --- |
| $S_A$ (client format) | $S_B$ (server) |
| null | null |
| Data | Instruction [parms] |

The client combine map component 1220 also combines the reply map 1110 and the response map 1014 to produce a reply-response map 1218.

TABLE 14

| Reply-Response map 1218 | |
| --- | --- |
| $S_D$ (server) | $S_C$ (client) |
| success | ErrorCode |
| null | null |
| null | MachineAddress |
| Time | Date: Time |
| RequestedData | RegistrationNumber |
| | Message: ""Registration number of" "deviceId" "is" <RegistrationNumber> |

At step 402, the client maps from client format directly to the server format SB before calling the server 460 using the request-input map 1216. The server 460 knows it has received the server format SB and disables the input map 1106, and the reply map 1110 as replies in SD format will be sent back to the client 450.

Steps 504, 505, 506, 512, 515 of FIG. 6, follow the same steps as corresponding steps of FIG. 5.

At step 614, the client map component 1204 maps from the server format SD to the client format Sc based on the reply-response map 1218.

After step 514 the client request program 1002 processes the result of the query ('AB24 CDE') in further aspects of its workflow C, method 600 ends.

In an alternative embodiment, after step 413 of FIG. 4, 400, in the background to message processing, the client 450 combines the request map 1206 with the input map 1106, and the reply map 1110 with the response map 1014. The client 450 also updates the HTTP request handler 1008 add headers to the HTTP request 1210, 1212, 1222 to inform the server 460 that it is receiving an optimized payload. All subsequent messages from the client use this new optimized path.

Server-Side Map Processing

Figure 7:
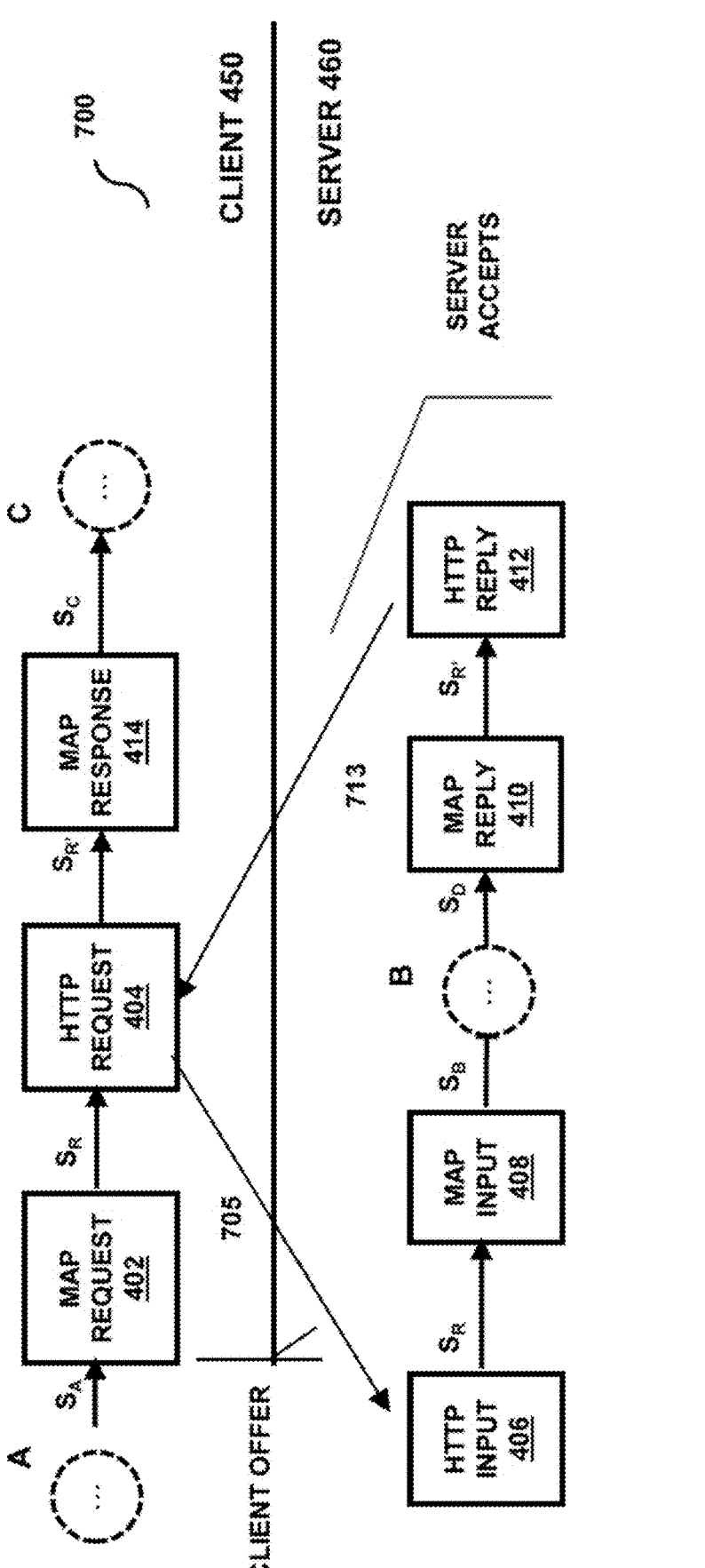
FIG. 7 depicts a high-level exemplary schematic flow diagram 700 depicting operation method steps for the client to request and receive data from the server, according to an embodiment of the present invention.

FIG. 7, which should be read in conjunction with FIGS. 8, 9, 12 and 13, depicts a high-level exemplary schematic flow diagram 700 depicting operation methods steps for a client 450 to request and receive data from a server 460, according to an alternative embodiment of the present invention.

Figure 8A:
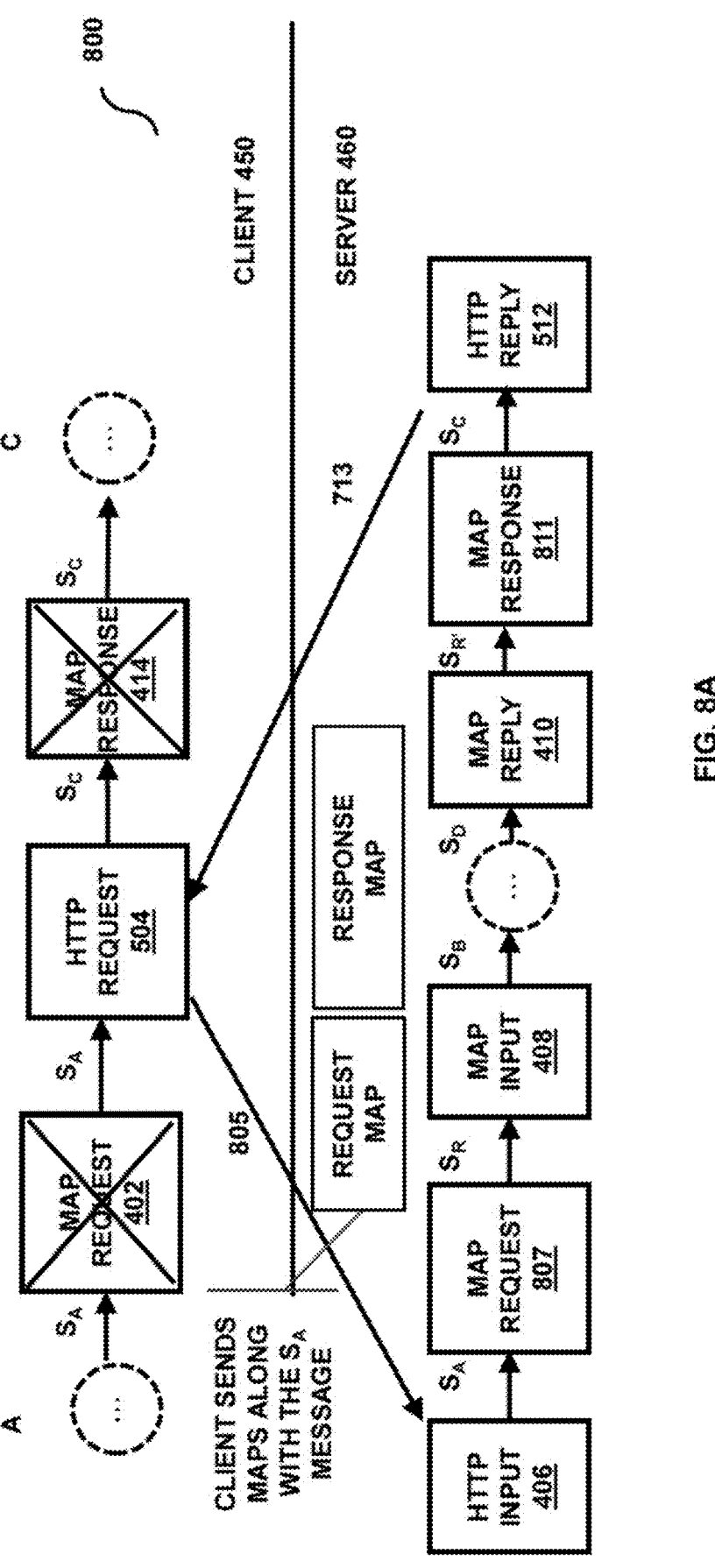
FIG. 8A also depicts a high-level exemplary schematic flow diagram 800 depicting operation method steps for the client to request and receive data from the server, according to an embodiment of the present invention.

FIG. 8A also depicts a high-level exemplary schematic flow diagram 800 depicting operation methods steps for the client 450 to request and receive data from the server 460, according to the alternative embodiment of the present invention.

Figure 8B:
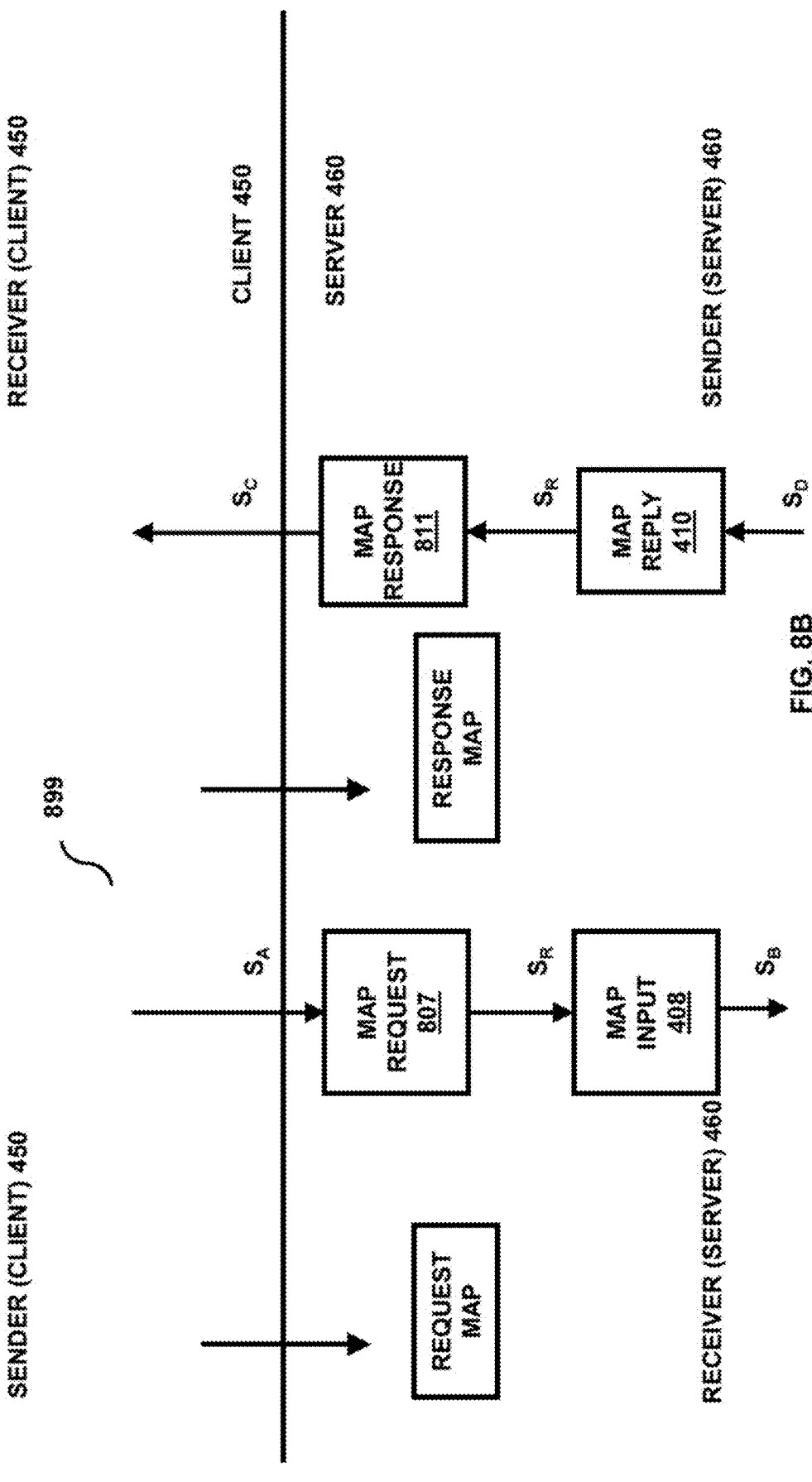
FIG. 8B depicts a high-level exemplary schematic flow diagram 599 depicting the map step operations of FIG. 8A, according to an embodiment of the present invention.

FIG. 8B depicts a high-level exemplary schematic flow diagram 899 depicting the map step operations of FIG. 8A.

Figure 9:
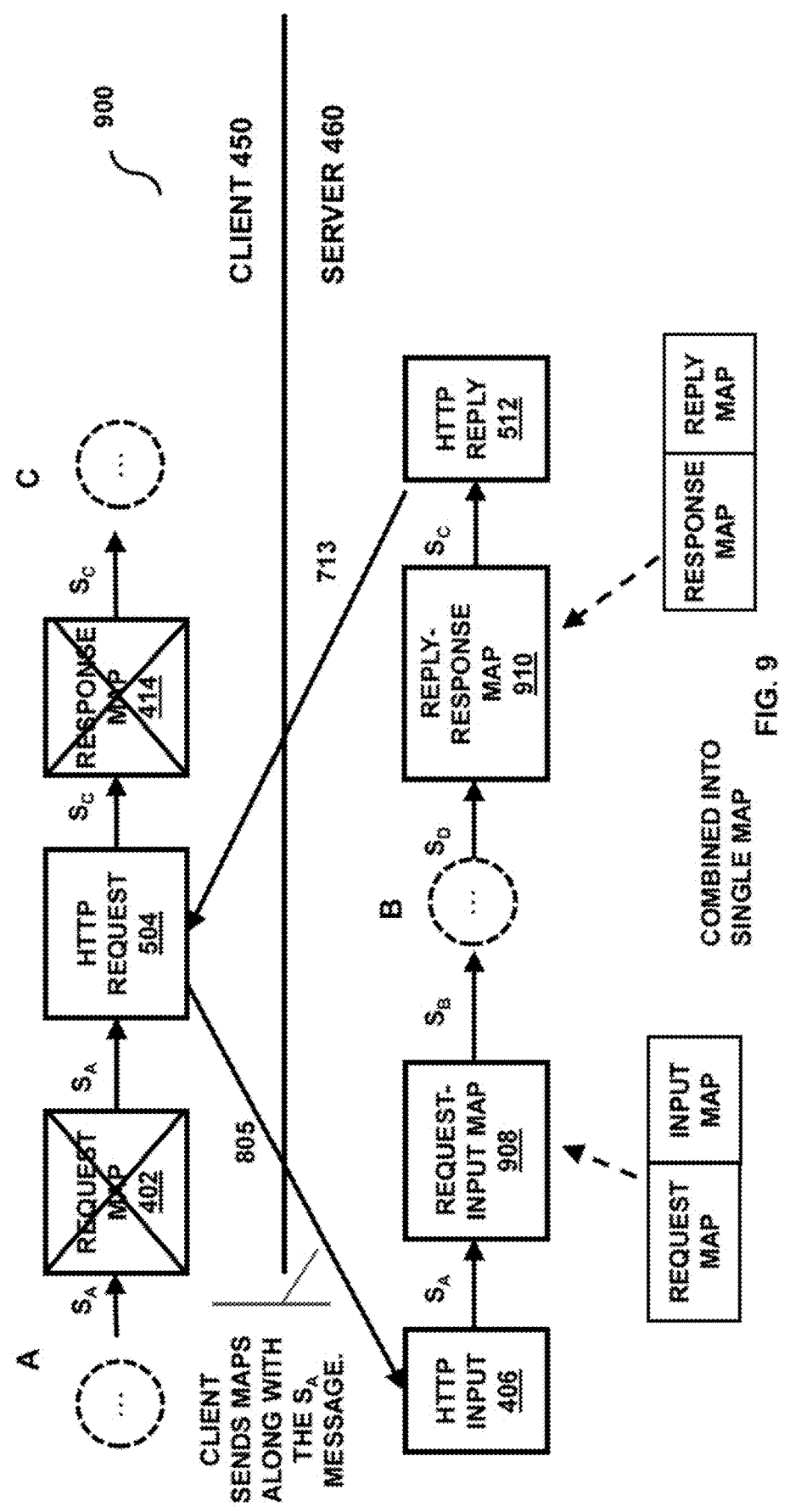
FIG. 9 also depicts a high-level exemplary schematic flow diagram 900 depicting operation methods steps for the client to request and receive data from the server, according to an embodiment of the present invention.

FIG. 9 also depicts a high-level exemplary schematic flow diagram 900 depicting operation methods steps for the client 450 to request and receive data from the server, 460 according to the alternative embodiment of the present invention.

In the alternative embodiment of FIGS. 7-9, in the initial handshake, the client 450 offers to send maps 1206, 1014, to the server 460.

FIG. 7 depicts an initial handshake between the client 450 and server 460. In this embodiment, the client 450 offers client maps 1206, 1014 to the server 460. The initial request to the server 460 follows the method of FIG. 3, except that the HTTP request 1210 comprises an additional header to suggest optimized mode along with the usual request.

If the server 460 chooses to honor the request, the server 460 responds with the reply data and also a request for the client 450 to send the maps 1206, 1014 along with the next request.

Messages after the first one can be optimized as long as the formats do not change. Renegotiation would be needed in that case.

Using the same example as used for FIG. 4, the client 450 executes the client request program 1002 in the client format SA.

At step 402, a client map component 1204 maps from the client format SA to a canonical format SR based on a request' map 1207 as follows:

TABLE 15

| Request' map 1207 | |
| --- | --- |
| $S_A$ (client format) | $S_R$ (canonical format) |
| H: Offer | H: OfferHandShake |
| Name of machine: | deviceId |
| Time | timestamp |
| Importance: [1, 2, 3, 4, 5] | priority: [1, 2, 3, 4, 5] |
| null | PGN |
| address | sourceAddress |
| null | destinationAddress |
| Data | data |

Note that the request' map 1207 is similar to request map 1206, except for a value of the header "Offer"/"OfferHand-Shake".

At step 404, a client HTTP request handler component 1208 prepares an HTTP request 1210, based on the parameters in canonical format SR. The HTTP request 1210 is similar to HTTP request 1010, except for an additional header "OfferHandShake" as follows:

TABLE 16

| HTTP request 1210 |
| --- |
| POST /sendISO11783Data HTTP/1.1 |
| Host: abc.example.com |
| Content-Type: application/json |
| Content-Length: 348 |
| OfferHandShake: 1 |
| { |
|     "deviceId": |
|         ........ |
|         "data": "0x123456789ABCDEF0" |
|     } |
| } |

At step 405, the client send component 1012 sends the HTTP request 1210 to the server 460. At step 406, a server input component 1102 inputs the HTTP request 1010, which is in the canonical form SR. Server code reads the identifier in the header of the HTTP request 1210 understanding 'OfferHandShake: 1' to mean that the client 450 is offering an optimization of maps. Server code can optionally choose not to accept the request, and subsequently the method of FIG. 3, 300 is followed.

At step 408, a server map component 1304 maps the HTTP request 1210 from the canonical format SR to a server format SB based on the input map 1106. The server query program 1108, which handles the client request, uses the variables and parameters from the server formal SB in the other integration logic of the workflow B. As in the method of FIG. 4, as requested, the workflow B carries out a query to provide the model of the vehicle ('Tractor-model C').

At step 410 the server map component 1304 maps the output of workflow B with format SD based on the reply map 1110.

At step 412, an HTTP reply handler component 1312 translates the output from the reply map step 410 into an HTTP reply 1314. HTTP reply 1314 is again similar to the HTTP reply 1114, except that it contains an additional header "OptimizeAccept".

TABLE 17

HTTP reply 1314

```
HTTP/1.1 200 OK
Content-Type: application/json
OptimizeAccept: 1
Format: S_R'
Date: Tues, 17 Jul 2024 10:35 GMT
X-Request-ID: abc123
{
     ......... }
```

At step 713, the server send component 1116 sends the HTTP reply 1314 to the client HTTP request handler component 1208, but unlike the method of FIG. 4, without any maps 1106, 1110. At step 414, the client map component 1204 maps from the canonical format SR' to a client format Sc based on the response map 1014.

After step 414 the client request program 1002 processes the result of the query ('Tractor-model C') in further aspects of its workflow C. The initial handshake of method 700 ends.

FIG. 8A also depicts a high-level exemplary schematic flow diagram 800 depicting operation methods steps for the client 450 to request and receive data from the server 460, according to an embodiment of the present invention. FIG. 8A depicts method steps 500 for interactions following the initial handshake depicted in FIG. 7. In the method 800 of FIG. 8A, the server 460 processes all maps 1207, 1106, 1110, 1014. The server 460 maps from client format SA to the server format SB via the canonical SR before workflow B. The client 450 disables the request 1207, and the response map 1014 as replies in SC format will be sent back to the client 450.

Using the same example as used for FIG. 4, the client 450 executes the client request program 1002 in the client format SA. For the next request, the client 450 is interested in the registration number of vehicle 'Tractor-model C'.

At step 402, the client disable component 1214 disables the request' map 1207, and also the response map 1014 of step 414.

At step 504, the client HTTP request handler component 1208 prepares an HTTP request 1222, based on the parameters in client format SA. The HTTP request 1222 is similar to HTTP request 1212, but is in SA format.

TABLE 18

HTTP Request SA 1222

```
POST /sendData HTTP/1.1
Host: abc.example.com
Content-Type: application/json
```

TABLE 18-continued

HTTP Request SA 1222

```
Format: S_A
RequestMap: <file request'map>
ResponseMap: <file responsemap>
{
     "Time": "2024-07-16T12:35Z",
     "iso11783Message": {
        "Importance": C,
        "Instruction": "0x0987654321ABCDEF00"
     }
}
```

At step 805, the client send component 1012 sends the HTTP request 1222 to the server 460. The client 450 also sends the request' map 1207, and the response map 1014. At step 406, the server input component 1102 inputs the HTTP request 1222, which is in client format SA. The skilled person would understand that sending the request' map 1207, and the response map 1014 can occur at any time before step 805.

At step 807, the server map component 1304 maps from the client format SA to the canonical format SR based on the request' map 1207 received from the client 450 during the handshake method of FIG. 7, described above.

At step 408, the server map component 1304 maps the HTTP request 1222 from the canonical format SR to a server format SB based on the input map 1106. The server query program 1108, which handles the client request, uses the variables and parameters from the server formal SB in the other integration logic of the workflow B. As requested, the workflow B carries out a query to provide the registration number of the machine ('AB24 CDE').

At step 410 the server map component 1304 maps the output of workflow B with format SD into the canonical format SR'.

At step 811 the server map component 1304 maps the output of workflow B with format SR' into the client format SC using the response map 1014.

At step 512, the HTTP reply handler component 1312 translates the output from the workflow B in client format SC into an HTTP reply 1316 in format SC.

TABLE 19

HTTP reply Sc 1316

```
HTTP/1.1 200 OK
Content-Type: application/json
OptimizeAccept: 1
Format: S_C
Date: Tues, 17 Jul 2024 125:35 GMT
X-Request-ID: abc123
{
     ......... }
```

At step 713, the server send component 1116 sends the HTTP reply 1316 to the client HTTP request handler component 1208. The client request program 1002 then processes the result of the query ('AB24 CDE') in further aspects of its workflow C. Method 800 ends.

FIG. 9 also depicts a high-level exemplary schematic flow diagram 900 depicting operation methods steps for the client 450 to request and receive data from the server 460, according to an embodiment of the present invention. FIG. 9 depicts method steps 900 for interactions following the initial handshake depicted in FIG. 7. In the method 900 of FIG. 9, the server 460 runs combined maps 1216, 1218. The server 460 uses the maps 1207, 1014 from the client 450 combined with the server maps 1106, 1110 to create new maps 1216, 1218 that convert directly between the formats SA, SB, SD, SC used by the flows A, B, C without needing the canonical formats SR, SR'. Advantageously, the combined maps 1216, 1218 can be more efficient than the original two maps (1207+1106), (1110+1014) executed sequentially.

Method 900 follows steps 402, 504, 805, 406 of FIG. 8A 800. At step 807, a server combine map component 1320 combines the request map 1207 and the input map 1106 to produce a request-input map 1216.

The server combine map component 1320 also combines the reply map 1110 and the response map 1014 to produce a reply-response map 1218.

At step 908, the server 460 maps from client format SA directly to the server format SB using the request-input map 1216. The server query program 1108, which handles the client request, uses the variables and parameters from the server formal SB in the other integration logic of the workflow B. As requested, the workflow B carries out a query to provide the registration number of the machine ('AB24 CDE').

At step 910, the server map component 1304 maps from the server format SD to the client format Sc based on the reply-response map 1218.

At step 512, the HTTP reply handler component 1312 translates the output from the workflow B in client format SC into an HTTP reply 1316 in format SC.

At step 713, the server send component 1116 sends the HTTP reply 1316 to the client HTTP request handler component 1208. The client request program 1002 then processes the result of the query ('AB24 CDE') in further aspects of its workflow C. Method 900 ends.

In an alternative embodiment, instead of HTTP, another communication protocol is employed. Examples of communication protocols include, but are not limited to: FTP (File Transfer Protocol): SMTP (Simple Mail Transfer Protocol); IMAP (Internet Message Access Protocol) and POP3 (Post Office Protocol 3); SSH (Secure Shell); Telnet: LDAP (Lightweight Directory Access Protocol); SNMP (Simple Network Management Protocol); WebSocket; MQTT (Message Queuing Telemetry Transport); AMQP (Advanced Message Queuing Protocol); SOAP (Simple Object Access Protocol); gRPC (gRPC Remote Procedure Call); RDP (Remote Desktop Protocol); and TFTP (Trivial File Transfer Protocol).

What is claimed is:

1. A computer-implemented method for communication between a sender and a receiver according to a communication protocol, the method comprising:
   generating a message for sending to a receiver;
   translating the message from a sender format used by the sender into a predetermined format dependent on the communication protocol;
   sending the translated message to the receiver, the translated message comprising a map invitation;
   causing the receiver to translate the translated message into a receiver format used by the receiver;
   causing the receiver to exchange a first map indicative of a mapping between a first format and the predetermined format; and
   sending a subsequent message to the receiver in the first format.

2. The computer-implemented method of claim 1, wherein causing the receiver to exchange comprises causing the receiver to send the first map to the sender, the first format comprising the receiver format.

3. The computer-implemented method of claim 2, wherein sending the subsequent message comprises:
   generating the subsequent message for sending to the receiver;
   translating the subsequent message from the sender format into the receiver format using the first map; and
   sending the subsequent message to the receiver in the receiver format.

4. The computer-implemented method of either of claim 3, wherein translating the subsequent message from the sender format into the receiver format comprises:
   translating the subsequent message from the sender format into the predetermined format using a second map indicative of a mapping between the sender format and the predetermined format; and
   translating the subsequent message from the predetermined format into the receiver format using the first map.

5. The computer-implemented method of claim 4, further comprising:
   generating a combined map indicative of a translation between the sender format and the receiver format, wherein translating the subsequent message from the sender format into the receiver format comprises using the combined map.

6. The computer-implemented method of claim 5, wherein generating the combined map is carried out in the background.

7. The computer method of claim 5, wherein generating the combined map comprises analyzing sub-structures of the first and second maps to produce a minimal function that maps elements required in an output schema of the combined map.

8. The computer-implemented method of claim 7, wherein an element used in only a selection from the group consisting of: the first map and second map, is removed from the combined map.

9. The computer-implemented method of claim 1, wherein causing the receiver to exchange comprises causing the receiver to receive from the sender the first map, wherein the first format comprises the sender format.

10. The computer-implemented method of claim 9 wherein sending the subsequent message comprises:
   generating the subsequent message for sending to the receiver;
   sending the subsequent message to the receiver in the sender format; and
   translating the subsequent message from the sender format into the receiver format using the first map.

11. The computer-implemented method of claim 1, wherein the communication protocol is HTTP.

12. A computer system for communication between a sender and a receiver according to a communication protocol, the computer system comprising:
   a processor set;
   one or more computer-readable storage media; and
   program instructions stored on the one or more computer-readable storage media to cause the processor set to perform operations comprising:
      generating a message for sending to a receiver;
      translating the message from a sender format used by the sender into a predetermined format dependent on the communication protocol;
      sending the translated message to the receiver, the translated message comprising a map invitation;

causing the receiver to translate the translated message into a receiver format used by the receiver;

causing the receiver to exchange a first map indicative of a mapping between a first format and the predetermined format; and sending a subsequent message to the receiver in the first format.

13. The computer system of claim 12, wherein causing the receiver to exchange comprises causing the receiver to send the first map to the sender, the first format comprising the receiver format.

14. The computer system of claim 13, wherein sending the subsequent message comprises:

generating the subsequent message for sending to the receiver;

translating the subsequent message from the sender format into the receiver format using the first map; and sending the subsequent message to the receiver in the receiver format.

15. The computer system of claim 14, wherein translating the subsequent message from the sender format into the receiver format comprises:

translating the subsequent message from the sender format into the predetermined format using a second map indicative of a mapping between the sender format and the predetermined format; and translating the subsequent message from the predetermined format into the receiver format using the first map.

16. The computer system of claim 15, wherein the operations further comprise:

generating a combined map indicative of a translation between the sender format and the receiver format, wherein translating the subsequent message from the sender format into the receiver format comprises using the combined map.

17. The computer system of claim 16, wherein generating the combined map is carried out in the background.

18. The computer system of claim 12, wherein causing the receiver to exchange comprises causing the receiver to receive from the sender the first map, wherein the first format comprises the sender format.

19. The computer system of claim 18 wherein sending the subsequent message comprises:

generating the subsequent message for sending to the receiver;

sending the subsequent message to the receiver in the sender format; and translating the subsequent message from the sender format into the receiver format using the first map.

20. A computer program product for communication between a sender and a receiver according to a communication protocol, the computer program product comprising:

one or more computer-readable storage media; and program instructions stored on the one or more computer-readable storage media to perform operations comprising:

generating a message for sending to a receiver;

translating the message from a sender format used by the sender into a predetermined format dependent on the communication protocol;

sending the translated message to the receiver, the translated message comprising a map invitation;

causing the receiver to translate the translated message into a receiver format used by the receiver;

causing the receiver to exchange a first map indicative of a mapping between a first format and the predetermined format; and sending a subsequent message to the receiver in the first format.

* * * * *